3,125,544
ASSOCIATION PRODUCT OF A POLYMERIC ETHER COMPOUND AND A PHENOLIC COMPOUND
Alfred E. Winslow, Scott Depot, and Keith L. Smith, Charleston, W. Va., assignors to Union Carbide Corporation, a corporation of New York
No Drawing. Filed Mar. 25, 1960, Ser. No. 17,472
30 Claims. (Cl. 260—43)

This invention relates to novel association products comprising a polymeric oxygen ether compound and a phenolic compound. In a particular aspect, this invention relates to the preparation of a class of resinous polyether-phenolic compositions suitable for utility as adhesives, films, protective coatings and molding and extrusion resins.

By the practice of this invention, association products of a polymeric oxygen ether compound and a phenolic compound can be prepared which range in properties from tacky, thermoplastic resins to rigid, tough, thermoset resins. The association products containing a substantial portion of polymeric polyether component are generally thermoplastic materials; the association products containing a substantial portion of phenolic component, although capable of being thermoplastic materials, are generally more easily and thoroughly thermoset when this is desirable. It will become apparent to one skilled in the art that within the scope of the present invention resinous compositions can be prepared with novel combinations of properties not heretofore possible with polyether and phenolic materials.

The term "association" refers to the interaction which provides the binding force between the polymeric oxygen ether component and the phenolic component in the resin compositions of the present invention. It is believed that the interaction involves one or more diverse mechanisms such as hydrogen bonding, electrostatic bonding, secondary valence forces, and the like. It appears that the phenomenon concerning hydrogen bonding can best explain the nature of the interaction. The "associating" or "complexing" interaction between the phenolic component and the polymeric oxygen ether component in the association products might be visualized in the following manner:

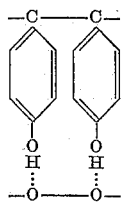

It is pointed out that prolonged baking of an association product, provided that there is no product degradation, indicates that water is not formed during the association reaction. When an association product is baked the weight of the product approaches the weight of the polyether and phenolic starting materials employed in preparing the association product. An important consequence of submitting association products to baking or heat treatment at elevated temperatures, for example, at temperatures between 50° C. and 200° C., is that the solubility or rate of solution of the association products in solvents is reduced.

The above postulated mechanisms of interaction are merely theoretical and should not be construed as limiting thereto. Other theories or reasons may equally well explain the true nature of the interaction.

By the terms "polymeric oxygen ether compound" and "polyether" as used herein are meant polymeric materials which contain an average of at least about 400 noncyclic aliphatic oxygen ether groups. The preferred polyether compounds are those which have a molecular weight between about 18,000 and 10,000,000 and which contain an average of from 0.5 to 2.85 noncyclic aliphatic oxygen ether groups per 100 molecular weight. The term "noncyclic aliphatic oxygen ether" includes only those ether groups found in the straight or branched organic chains of the polyether molecules. Thus, for example, poly(ethylene oxide) possesses the repetitive unit

—CH$_2$CH$_2$O— in the polymer chain; the oxygen atom in this repetitive unit would be considered to be a "noncyclic aliphatic oxygen ether" group. On the other hand, any ether groups which form a portion of an organic ring such as, for example, the oxygen atom in tetrahydrofuran or the oxygen atoms in dioxane, are not counted or included in the term "noncyclic aliphatic oxygen ether." The terms "an average of" or "at least an average of" are employed since the molecular weight or the number of etheric atoms found by analyzing the polyether, in the usual instance, will be an average value or average number. In the absence of suitable molecular weight determination, the polyethers are characterized as having a reduced viscosity in excess of 0.3 and not greater than 100 in the best solvent available for a particular polyether. Molecular weight may be determined by standard methods such as ultracentrifuge, light dissymmetry or osmotic pressure. Reduced viscosity may be determined with the Ubbelohde, the Ostwald or equivalent viscometer in the temperature range between 20° C. and 30° C., using a resin concentration in solution sufficiently low to produce an approximate linear relationship between reduced viscosity and polymer concentration between infinite dilution and the concentration at which the reduced viscosity is determined. Reduced viscosity is defined by the expression:

$$I_r = \frac{T - T_0}{(T_0)(C)}$$

wherein T is the time required for a low concentrate polymer solution to pass through a standardized Ubbelohde viscometer; wherein $T_0$ is the time for the pure solvent to pass through the viscometer; and wherein C is the concentration of the solution.

The term "phenolic compound" refers to compounds containing at least one phenolic group corresponding to the structure

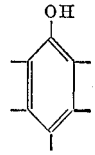

wherein said phenolic group or phenolic groups are present in an amount of at least 0.5 mole, on the average per 100 molecular weight of the phenolic molecule. For example, phenol itself contains about 1.1 moles of phenolic groups per 100 molecular weight. Because of the extraordinary associating power between phenolic compounds and polyether compounds as defined herein, the phenolic compounds which can be employed range from phenol itself to complex polymeric phenolic materials such as novolaks and resoles. The selection of a particular phenolic compound is determined by the properties desired in the final association product and by practical considerations such as compatibility with the other composition components, and cost and availability.

Various aspects and advantages of the instant invention are hereinafter fully described. Other aspects and advantages will become apparent to those skilled in the art from the accompanying description and disclosure.

It has been discovered that valuable resins are obtained when certain high molecular weight polymeric oxygen ether compounds as defined herein are contacted with phenolic compounds under conditions which permit the formation of water-insoluble association products. In general, the quantities of polymeric ether compound and phenolic compound in the association products can vary between about 99 and 1 parts by weight of polymeric ether and between 1 and 99 parts by weight of phenolic compound. The preferred ratio is between about 90 and 5 parts by weight of polymeric ether compound and between 10 and 95 parts by weight of phenolic compound. The association of a major portion of polymeric ether compound with a minor portion of phenolic compound produces modified polyether resins with new and useful properties. The association of a major portion of phenolic compound with a minor portion of polymeric oxygen ether compound produces modified phenolic compounds with new and useful properties. A wide variety of phenolic resins or simple or complex phenolic compounds can be employed. Phenolic resins can be rendered tough and flexible by association with the polymeric ether compound. The phenolic resins can be caused to thermoset in the presence of polyethers or allowed to remain thermoplastic, as desired. The polymeric ether compounds can be made insoluble and high softening for use as molding compounds, can be made soft for use as pressure-sensitive adhesives, or associated as slowly dissolvable complexes which release controlled amounts of materials such as cresol and hexachlorophene.

The method of contacting these materials to form the association products generally is determined by the quantity and nature of the respective starting materials, particularly the phenolic component. The methods of contacting the polymeric oxygen ether compounds and phenolic compounds fall into two general categories: (1) association without condensation, and (2) association with condensation. The term "condensation" refers to the polymerization and cross-linking of a phenol-formaldehyde-type phenolic component. "Association without condensation" refers to product formation usually occurring as soon as mixing of the designated components is effected. Both the thoroughness of mixing, and completeness of solvent removal (if present), favor maximum conversion and resulting useful changes in properties. "Association with condensation" refers to the occurrence of the phenol-formaldehyde condensation reaction to convert the phenolic component to less thermoplastic or completely thermoset material in the presence of the polyether component. Since mixing of the components precedes the condensation reaction, "association without condensation" may occur in part prior to the condensation step in examples illustrating "association with condensation," whereupon completion of the association step ocurs simultaneously with the condensation reaction.

The methods of forming association products without condensation are generally employed for producing thermoplastic association products. The phenolic component of the compositions varies between simple, low molecular weight phenols such as cresol to complex, thermoplastic resins such as novolaks. The association without condensation method is useful for producing slowly-dissolvable complexes which provide controlled release of bacteriostats, insecticides, fungicides, surfactants, and the like. The method is also applicable for the production of insoluble complexes which are useful as gelling agents, pressure-sensitive adhesives, flexible, extensible package films and forms, sizing agents for textiles, detoxication agents for phenolic poisons present in biological organisms, and the like. The simple, low molecular weight phenols are used for the formation of slowly-dissolvable association products, while complex phenolic compounds containing multiple phenol groups are used for the formation of insoluble association products. The particular polyether component employed is chosen on the basis of (a) solubility in particular solvents, (b) thermoplastic processability, (c) inherent flexibility and toughness, and (d) economic considerations. The polyether preferably should have an average molecular weight in excess of 100,000. Upper molecular weight limits are determined by the melt viscosity range for thermoplastic processing, or by viscosity thickening efficiency (i.e., viscosity increase produced by a given concentration of polymer dissolved in a solvent) in the range needed to provide a gel strength sufficient to permit handling of various polyether-phenolic ratios. Poly(ethylene oxide) is preferred for aqueous solvent systems.

In the association without condensation method of producing association products, the contacting of the polymeric ether and phenolic compounds can be accomplished by the simple expediency of dissolving the materials in a mutual solvent, or in different but miscible or emulsifiable solvents for each material, or, when both the polyether and phenolic components are solids, by dispersing the materials in mutual nonsolvents or gelling agents in a finely-divided form. The polyether and phenolic materials can also be mixed as a hot melt if their elevated temperature properties permit, or they can be fluxed together on conventional thermoplastic equipment such as calenders, extruders, two-roll mills and the like. The mixing of the polyether and phenolic compound in solution is frequently characterized by the precipitation of the resulting association product as a solid which is easily recoverable by standard methods. As an illustration, when an aqueous solution of poly(ethylene oxide) is treated with cresol at a pH in the acid range, a solid precipitate forms which can be filtered and dried to a resinous product.

The properties of the association products diverge most widely from the corresponding additive properties of the polyether and phenolic components when the polyether and phenolic components are in a weight ratio providing approximately equimolar quantities of ether and phenol groups, i.e., when the number of noncyclic ether groups present in the polyether component is approximately equal to the number of phenolic hydroxy groups in the phenolic component. The term "equimolar" refers to equivalent weights. Hence, the basic reference point is the gram molecular weight of polyether which provides one mole of ether group, and the gram molecular weight of phenolic compound which provides one mole of phenolic hydroxy group. For example, 114 grams of bisphenol-A (half the molecular weight) contains one mole of phenolic hydroxy group, and 44 grams of poly(ethylene oxide) contains one mole of ether group. Useful association products can be made with as little as 2 mole percent or less of the polyether component, or with as little as 0.4 mole percent or less of the phenolic component. Hence, the ratio of the non-cyclic ether to phenolic hydroxy groups in the association products varies between about 0.02 and 240 ether groups per phenolic hydroxy group.

Another aspect of the instant invention is directed toward maintaining the polymeric ether compound and phenolic compound in solution. This aspect involves both the process and the resulting composition. It has been observed that a pH above about 8 to 10 will prevent precipitation of an association product from solution, particularly in the presence of an aqueous media. The instant invention offers several means for maintaining the components in solution from which solutions, useful films, protective coatings and adhesive coatings can be prepared. It has been observed that various agents (hereinafter termed "inhibitors" or "solubilizing agents") can prevent precipitation of an association product in accordance with the teachings hereinafter set forth. The inhibitors contemplated include, among others, water-soluble ketones, e.g., acetone, methyl ethyl ketone, acetonylacetone, and the like; monoalkyl ethers of alkylene glycols, preferably the mono-lower alkyl ethers of ethylene glycol and propylene glycol, e.g., monomethyl ether of ethylene glycol, monoethyl ether of ethylene glycol, and the like; alkali metal bases such as the hydroxides, e.g., sodium hydroxide, potassium hydroxide, and the like; alkali metal salts of weak acids, e.g., sodium bicarbonate, sodium acetate, potassium carbonate, and the like; ammonia and water-soluble amino compounds, e.g., ethanolamine, ethylenediamine, triethanolamine, pyridine, piperazine, piperidine, trimethylamine, triethylamine, triisopropanolamine, and the like. Other inhibitors can be exemplified by compounds such as dioxane, diacetone alcohol, ethyl alcohol, dimethylsulfoxide, acrylic acid, acetic acid, hydrazine, alcohols in general, and the like.

The amount of inhibitor or solubilizing agent necessary to prevent precipitation of the association product will depend on several considerations, some of which follow: The particular phenolic compound employed including its molecular weight, the number of free phenolic hydroxy groups contained by the phenolic compound, the concentration of the phenolic compound, the particular polymeric ether compound employed including its molecular weight, the number of etheric groups contained in the polymeric ether compound, the concentration of the polymeric ether compound, the particular inhibitor or solubilizing agent of choice, and other factors. In general, an inhibiting amount or solubilizing amount of the above-exemplified compounds is employed, i.e., an amount of inhibitor or solubilizing agent at least sufficient to prevent precipitation of the association product. In view of the teachings herein, it can be readily determined by routine laboratory procedure, the quantity of inhibitor or solubilizing agent required to prevent precipitation.

It has been observed that when the above-exemplified water-soluble ketones and monoalkyl ethers of alkylene glycols are employed to prevent precipitation, about one-third of the weight (of said ketone or glycol), based on the total solution weight, is required when the polyether, for example, is poly(ethylene oxide) with a reduced viscosity of about 1.0 or greater (as measured in water at a concentration of 0.2 gram of polymer per 100 milliliters of water at 30° C.). Lesser amounts of the above-illustrated ketones or glycols are required as the number of ether groups (etheric atoms) in the polyether is decreased.

With inhibitors or solubilizing agents such as the alkali metal hydroxides, the alkali metal salts of weak acids, ammonia, water-soluble amino compounds, and the like, the amounts of inhibitors which can be employed are sufficient to maintain the pH of the solution (containing the polymeric components) above about 8 to 10. The operator can readily determine the pH of the solution by conventional means, particularly in the presence of an aqueous media. Precipitation of the association product can then be effected by adjusting the pH of the solution to about 7.7 and lower, preferably to a pH in the range of from about 2.0 to 7.7. Inorganic acids such as hydrochloric acid are satisfactory for lowering the pH of the solution.

When precipitation of the association product from solution has been prevented by the incorporation therein of one of the above illustrated water-soluble inorganic bases, alkali metal salts of weak acids, or organic bases, evaporation of the solution to dryness, such as by air-drying or under reduced pressure, followed by baking the resulting residue, at elevated temperatures, will yield an associated product.

Although inhibited solutions of the polymeric ether compound and phenolic compound are most economical when water is part of the liquid vehicle, inhibited solutions may also be formed in the absence of water. Most of the inhibitors listed for water systems are also effective under anhydrous conditions. When acetonitrile is the liquid medium, acetone is a useful inhibitor; when dimethylformamide is the liquid medium, acetonitrile, for example, is an effective inhibitor.

Various modes of incorporating or adding the inhibitor into the system can be employed. For instance, the inhibitor can be mixed with either the polyether component and/or phenolic component prior to forming separate solutions containing the polymeric component in question. Alternatively, the inhibitor can be added to a solution containing the polyether component and/or a solution containing the phenolic component prior to mixing both solutions. If desired, both solutions can be mixed in the absence of the inhibitor, and the resulting precipitate, if any, subsequently can be dissolved by adding, for example, a water-soluble ketone or monoalkyl ether of an alkylene glycol to the system. In this case, it is preferred that the precipitate not be dried prior to the incorporation of the above illustrated inhibitors which are employed to effect solution. The basic inhibitors, e.g. alkali metal hydroxides, alkali metal salts of weak acids, ammonia, water-soluble amino compounds, etc., are particularly suitable agents for adjusting the pH of the system within the range desired. Consequently, when such exemplified basic inhibitors are employed to maintain the pH of the solution above about 8 to 10, the subsequent acidification of the solution to decrease the pH thereof to about 7.7 and lower will result in precipitation. Alternatively, a precipitated product can be returned to solution by the addition of the basic inhibitor thereto in an amount sufficient to bring the pH of the solution into the proper range, e.g., above about 8 to 10.

As mentioned previously, the second general category of methods of preparing association products is characterized by association with condensation methods. The association products produced by one of these methods can be either thermoplastic or thermoset in nature. Of major importance are molding and extrusion resins which are easily formed into tough, flexible, high softening and insoluble articles. These methods are essentially limited to phenolic components which are capable of undergoing condensation reactions, or may have already undergone partial condensation, e.g., phenolic novolak and resole components. When the polymeric ether compound is to be added to the phenolic component before condensation or after condensation is partially complete, the phenolic component, including the constituents necessary for condensation (e.g., aldehydes, catalysts, and the like) must be capable of intimate mixing with the polymeric ether component, either by means of a common solvent or mutually miscible or emulsifiable solvents, or by fluxing on conventional thermoplastic equipment. The condensation of the phenolic component proceeds in the presence of a polymeric ether compound essentially in the same manner as when the polymeric ether compound is absent.

As with the previously described association without condensation methods, in the association with condensation methods the greatest departure from the additive properties (synergism) of the polyether and phenolic components is observed when the ratio of ether groups to phenolic hydroxy groups approaches unity. However, useful association products can be obtained which contain 2 mole percent or less of the polyether component, or with as little as 0.4 mole percent or less of the phenolic component.

For optimum association effects by the association with condensation method, the polymeric ether component, e.g., poly(alkylene oxide), preferably has a molecular weight in the range above about 50,000. As in the association without condensation method, the upper limit of molecular weight is determined by optimum melt viscosity for thermoplastic processing and/or thickening efficiency desired at the polyether concentration needed to effect certain property modifications in the final association product. Frequently the optimum molecular weight of the polymeric ether component because of processing limitations is about 300,000, although association products from polyethers of at least 10,000,000 molecular weight have physical properties no less desirable than those made from lower molecular weight polyethers.

The choice of phenolic component is dependent on color, reactivity, and other factors important in any resinous phenolic material. The phenolic component can be a partially condensed or condensed phenolic resin, or it can be a primary condensation mixture of a phenol compound, an aldehyde and a catalyst. When the condensation reaction is to be conducted in two stages, it is preferred that the extent of condensation in the first stage be the maximum consistent with solubility in common solvents and/or thermoplastic processability of the first stage product.

A very desirable combination of limited extensibility along with a substantial amount of crosslinking and elastic recovery is obtained in the final association with condensation product when the ether group to phenolic hydroxy group ratio approaches unity. Lowering the degree of total crosslinking results in greater extensibility and less elastic recovery. Solvent resistance, especially resistance to water, is highest when polyether concentration is relatively low and the degree of crosslinking or condensation is relatively high. The best combination of strength, toughness and extensibility is found when at least a part of the polyether component is present during the initial condensation reaction of the phenolic component. Acid condensation catalysts are preferred (e.g., preparation of novolak phenolic component) for the association with condensation method since these catalysts promote rather than inhibit polyether-phenolic association.

An association with condensation method of preparing association products can be performed by several different procedures depending on the nature of the starting materials and/or the particular properties desired in the final association product. In one procedure, the phenolic component is partially condensed in the presence of part or all of the polyether component. The resulting association products have properties similar to the association products produced by the previously described association without condensation method and can be used in the same type of applications, or they can be further condensed to produce less thermoplastic or thermoset materials. The partial condensation of a phenolic component is conventionally performed in a stirred kettle with a vapor condensation system. The quantity of polyether component added in such operations is usually limited in order to prevent overloading of the apparatus. Mixing of the polyether and phenolic components can then be completed in a pug mill, roll mill, Banbury or other masticating device after the excess phenol and aldehyde constituents are stripped from the mixture in the kettle-still system. Alternately, extra mutual solvent may be added to the original ingredients or to the products to facilitate mixing and shaping. An inhibitor for association, such as acetone, which may also be a mutual solvent for the polyether and phenolic components, is an especially useful solvent for such purposes. A typical sequence using this procedure consists in adding the phenolic constituent (e.g., phenol, cresol, and the like), the aldehyde constituent, the condensation catalyst and a part of the polyether component to the reaction kettle, together with sufficient mutual solvent to facilitate agitation. The mixture is refluxed for the time required to produce partial condensation, e.g., a period between one and eight hours. Then the catalyst is neutralized, the excess condensation reactants are stripped off and the reaction mixture is cooled to room temperature. Some aldehyde and/or catalyst for the second stage condensation may be added, followed by sufficient polyether to make the partially condensed mixture workable in the masticating equipment. The mixture is transferred to the masticating equipment and the balance of the polyether is added, either with or without additional solvent and/or association inhibitor. The homogeneous mixture so prepared is then vacuum dried and a final cure performed in a molding press, extruder or oven. Any association inhibitor employed during the procedure is either neutralized or removed by evaporation during one of the stages leading to the final association product.

In another procedure, the polyether component is compounded with a partially condensed phenolic component after which further condensation may be effected. The polyether component and the partially condensed phenolic component can be compounded by dissolving in a mutual solvent or in separate but miscible solvents, by suspending in non-solvents or by melting or with fluxing the materials together on thermoplastic processing equipment. More than one of these compounding methods may be used in the preparation of a given association product. In one preferred method, the polyether and phenolic components are dissolved in a mutual solvent, evaporated to dryness and then fluxed or formed by thermoplastic means. The polyether-phenolic mixture can be compounded with an aldehyde and a catalyst for a second stage condensation reaction, or it can be admixed with other phenolic derivatives, other compatible resins, fillers, coloring agents, and the like. When a highly extensible to elastomeric composition is to be produced, it is preferred to incorporate the phenolic component ingredients necessary to the final condensation reaction at the time the polyether component and the partially condensed phenolic component are compounded together. If the components are mixed together and dried without incorporating the second stage curing ingredients, then a very tough, rubber-like mass is produced, into which it is difficult to intimately incorporate other materials. On the other hand, where resilient but less elastomeric association products are to be produced, usually with lower concentrations of polyether component, the the polyether component and partially condensed phenolic component may be compounded together, dried and ground into a fine powder into which other ingredients can be later mixed.

In another procedure, primary phenolic condensation constituents, usually the aldehyde constituent, are employed as gelling agents for the polyether component. Then phenol and aldehyde constituents and the condensation catalyst are mixed and added to the polyether to form a gel mass or gel solution. Condensation either to a thermoplastic mass (in the presence of an acid catalyst) or to an infusible resinous composition (in the presence of a basic catalyst) is then carried out in this form.

In still another procedure, the polyether component dispersed or dissolved in a suitable fluid is adsorbed by a finely-divided, solid phenolic component, which phenolic component is substantially insoluble in the fluid employed with the polyether. The polyether component may be dissolved from the solid phenolic component by a mixture of an association inhibitor and a solvent or dispersing agent for the polyether resin. Alternatively, a finely-divided phenolic material which is suspended in a fluid may be coagulated and removed from suspension by the incorporation into the suspension of a small amount of polyether dissolved in the suspending fluid, or a fluid miscible with it.

On the other hand, the phenolic component dispersed or dissolved in a suitable fluid can be adsorbed by a finely-divided, solid polyether component, which polyether component is substantially insoluble in the fluid employed with the phenol. Both the phenolic component on which is adsorbed polyether component, and the polyether component on which is adsorbed phenolic component, art useful molding materials, the properties depending on the ratio of one to the other as previously described.

The association product can be recovered by a number of methods, some of which have been previously described. When a precipitate forms on mixing the solutions the precipitate can be recovered by known methods such as filtration or decantation. When mixing results in incomplete precipitation of the added polyether and phenolic compound a further yield of the product can be recovered by treating the solution with an acid. Hydrochloric acid is satisfactory for this purpose and a suitable pH range after treatment with acid is in the pH range of from about 2 to 7.7. When the precipitation has been inhibited, for example, by a ketone or a monoalkyl ether of alkylene glycol such as illustrated previously, the association product can be recovered by drying the solution in the air or under a vacuum. Acidifying the solution inhibited by water-soluble amines, ammonia, the alkali metal bases, or alkali metal salts of weak acids, also serves to precipitate the product.

In the usual instance it is desirable to dry the precipitated product. This may be accomplished by air-drying or the baking methods previously described. Satisfactory results are also obtained by drying the product under vacuum.

The polymeric oxygen ether compound contemplated as starting material can be expressed in terms of noncyclic aliphatic oxygen ether groups (or atoms) (for sake of brevity the terms "etheric atoms" or "etheric groups" are employed throughout) per 100 molecular weight. As stated hereinabove only those etheric atoms found in the straight or branch chains of the polyether molecule are counted; the oxygen atoms forming a part of an organic ring in the polyether molecule are excluded. Broadly, the number of noncyclic aliphatic ether groups per 100 molecular weight contained by the polyether is in the range of from about 0.5 to 3.33. Preferably, this range is from about 0.5 to 2.85 etheric groups per 100 molecular weight, and still more preferably the range is from about 0.5 to 2.3 etheric groups per 100 molecular weight. A highly desirable range is from about 1.0 to 2.3 etheric groups per 100 molecular weight, and an especially preferred range is from about 1.5 to 2.3 etheric groups per 100 molecular weight. With reference to the above said ranges, the lower limit of about 0.5 includes such compounds as phosphoric acid-diethylene glycol polyester (about 0.54), some methyl celluloses, and the like. The upper limit of 3.33 is governed or restricted by polyoxymethylene, the simplest polyether applicable; the upper limit of 2.85 is restricted by 50/50 oxymethylene-oxyethylene copolymer, poly(dioxolane), and the like; the upper limit of 2.3 is restricted by poly(ethylene oxide). Poly(ethylene oxide) having a reduced viscosity above about 0.5 (at a concentration of 0.2 gram of polymer in 100 milliliters of acetonitrile at 30° C.) is eminently preferred. These poly(ethylene oxides) are hard, tough, horny, resinous materials. The polyether component contains at least an average of 400 etheric groups, preferably at least an average of 450 etheric groups, and still more preferably at least an average of 600 etheric groups. In a highly preferred embodiment the polyether component contains at least an average of 1000 etheric groups, this minimum limit, i.e., 1000 etheric groups, being approximately the point where poly(ethylene oxide) is a resinous compound such as described above.

The polyethers contemplated include, for example, the poly(alkylene oxides) prepared by polymerizing ethylene oxide, propylene oxide, epoxybutane, and the like, and mixtures thereof; the polyoxyalkylene glycols and ethers thereof such as can be made by reacting ethylene oxide, propylene oxide, etc., and mixtures thereof, with small amounts of hydroxylic compounds such as aliphatic alcohols, glycols, phenols, glycerol, sorbitol, and the like. Resinous homopolymers of 1,2-alkylene oxides as well as resinous copolymers of an admixture of 1,2-alkylene oxides (with reduced viscosities of at least about 0.5, as determined from a solution containing 0.2 gram of polymer in 100 milliliters of solvent such as acetonitrile at 30° C.) are highly preferred classes of polyethers. The 1,2-alkylene oxides can be, for example, ethylene oxide, propylene oxide, the epoxybutanes, the epoxy- pentanes, styrene oxide, chlorostyrene oxide, and the like. Polyethers prepared by reacting ethylene oxide, propylene oxide, and other olefinic oxides with synthetic and naturally occurring polymeric materials such as the novolaks, polyvinyl alcohol, polyamides, starches, cellulose, partially etherified cellulose, carboxymethyl cellulose, partiallly etherified starch, carboxymethyl starch, polycarboxylic acids (monomers and polymers), polysulfonamides, polycarbamides, and the like, are suitable as are the polyethers prepared by the reaction of, for example, ethylene oxide and propylene oxide with the glucosides and sugars, e.g., methyl glucoside, sucrose, glucose, and the like. Moreover, polyethylene glycol and polypropylene glycol and ethylene oxide-propylene oxide copolymer glycols which have been reacted with a diisocyanate, or a diepoxide such as diglycidyl diether of a bisphenol to provide longer chain polyether components are also suitable. The end groups of the polyalkylene-polyols and of the higher molecular weight resinous homopolymers and copolymers and other polyethers are not critical to the invention, and may be carboxylic ester groups, inorganic acid ester groups, amides, amines, as well as ether, halogen, acetal, hemiacetal, aldehyde or carboxyl. Fatty acid-derived hydrocarbon end groups may be attached, for example, through ester, amide, ether groups, and the like. These same organic functional groups can also be permitted as occasional or repetitive substituents, either attached to or within the backbone of the polyether chains, so long as they do not unduly lower the ether group concentration.

In Formulas I through VII to follow, there are illustrated structurally some of the subgeneric classes of polyethers (or their typical structural unit or group) which are applicable as starting material in the instant invention. As disclosed previously, the minimum molecular weight of the polyether component is at least 18,000. Of course, these formulas are by no means exhaustive of the polyether subclasses which can be used.

I.

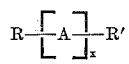

wherein A can be oxyalkylene, e.g., oxyethylene, oxypropylene, oxybutylene, oxytrimethylene, oxytetramethylene, and the like; wherein R is attached to the oxygen atom of A and can be hydrogen, a hydrocarbon radical, e.g., alkyl, alkenyl, cycloalkyl, aryl, alkaryl, aralkyl, and the like; and wherein R' is attached to a carbon atom of A and can be hydrogen, halogen, e.g., chlorine, bromine, and the like, a hydrocarbon radical, e.g., alkyl, alkenyl, cycloalkyl, aryl, alkaryl, aralkyl, and the like. In addition, R' can be alkoxy, aryloxy, and the like; and wherein $x$ has a value such that the reduced viscosity of the polymer is at least 0.3.

II.

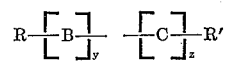

wherein B and C are different oxyalkylene radicals such as oxyethylene, oxybutylene, oxypropylene, oxypentylene, oxystyrene, and the like; wherein each R and R', individually, can be hydrogen, a hydrocarbon radical, e.g., alkyl, cycloalkyl, alkenyl, aryl, aralkyl, alkaryl, and the like. In addition, R and R', individually, when attached to a carbon atom of B or C can be halogen, e.g., chlorine, bromine, and the like, alkoxy, aryloxy, and the like; and wherein $y$ and $z$ are numbers having a minimum value of 1, and the sum of $y$ and $z$ is such that the reduced viscosity of the copolymer is at least 0.3.

III.

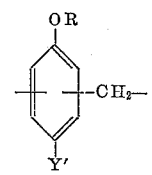

wherein Y' can be hydrogen or a hydrocarbon radical, e.g., alkyl or aryl; and R can be one of the following illustrative groups:

(a)
$$-\!\!\left(\mathrm{CH_2CH_2O}\right)_m\!\!Y$$

(b)
$$-\!\!\left(\mathrm{CH_2CH_2CH_2O}\right)_m\!\!Y$$

(c)
$$-\!\!\left(\mathrm{CH_2CHO}\atop\mathrm{CH_3}\right)_m\!\!Y$$

wherein Y can be hydrogen or a hydrocarbon radical, e.g., alkyl or aryl; and $m$ is an integer and can vary from one R to another; and wherein the polymer containing the above typical structural unit has a reduced viscosity of at least 0.3.

IV.

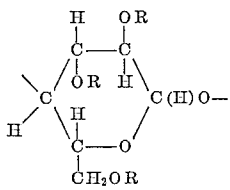

wherein each R, individually, can be hydrogen, alkyl, e.g., methyl, ethyl, propyl, and the like, or one of the following groups:

(a)
$$-\!\!\left(\mathrm{CH_2CH_2O}\right)_m\!\!Y$$

(b)
$$-\!\!\left(\mathrm{CH_2CH_2CH_2O}\right)_m\!\!Y$$

(c)
$$-\!\!\left(\mathrm{CH_2CHO}\atop\mathrm{CH_3}\right)_m\!\!Y$$

wherein Y can be hydrogen or a hydrocarbon radical, e.g., alkyl or aryl; and $m$ is an integer and can vary from one R to another; and wherein the polymer containing the above typical structural unit has a reduced viscosity of at least 0.3.

V.

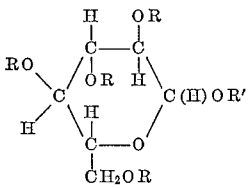

wherein R can be hydrogen, and wherein each R and R', individually, can be alkyl, e.g., methyl, ethyl, propyl, and the like, or one of the following groups:

(a)
$$-\!\!\left(\mathrm{CH_2CH_2O}\right)_m\!\!Y$$

(b)
$$-\!\!\left(\mathrm{CH_2CH_2CH_2O}\right)_m\!\!Y$$

(c)
$$-\!\!\left(\mathrm{CH_2CHO}\atop\mathrm{CH_3}\right)_m\!\!Y$$

wherein Y can be hydrogen or a hydrocarbon radical, e.g., alkyl or aryl; and $m$ is an integer and can vary from one R to another; and wherein the polymer structurally represented above has a reduced viscosity of at least 0.3.

VI.

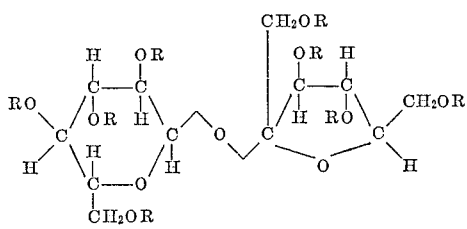

wherein each R, individually, can be hydrogen, alkyl, e.g., methyl, ethyl, propyl, and the like, or one of the following groups:

(a)
$$-\!\!\left(\mathrm{CH_2CH_2O}\right)_m\!\!Y$$

(b)
$$-\!\!\left(\mathrm{CH_2CH_2CH_2O}\right)_m\!\!Y$$

(c)
$$-\!\!\left(\mathrm{CH_2CHO}\atop\mathrm{CH_3}\right)_m\!\!Y$$

wherein Y can be hydrogen or a hydrocarbon radical, e.g., alkyl or aryl; and $m$ is an integer and can vary from one R to another; and wherein the polymer structurally represented above has a reduced viscosity of at least 0.3.

VII.

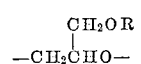

wherein R can be alkyl, e.g., methyl, ethyl, propyl, and the like; or one of the following groups:

(a)
$$-\!\!\left(\mathrm{CH_2CH_2O}\right)_m\!\!Y$$

(b)
$$-\!\!\left(\mathrm{CH_2CH_2CH_2O}\right)_m\!\!Y$$

(c)
$$-\!\!\left(\mathrm{CH_2CHO}\atop\mathrm{CH_3}\right)_m\!\!Y$$

wherein Y can be hydrogen or a hydrocarbon radical, e.g., alkyl or aryl; and $m$ is an integer and can vary from one R to another; and wherein the polymer structurally represented above has a reduced viscosity of at least 0.3.

Many of the polyethers described are known materials and are readily available. The higher molecular weight polymers of ethylene oxide, propylene oxide, and the like, copolymers thereof, and copolymers of ethylene oxide, propylene oxide, and the like, with the other lower olefin oxides, e.g., the epoxybutanes, the epoxypentanes, styrene oxide, and the like, can be prepared by various methods.

Poly(ethylene oxide) with a reduced viscosity of about 1.0 or greater when measured at 30° C. at a concentration of 0.2 gram of polymer in 100 milliliters of acetonitrile can be made by a variety of processes (the reduced viscosity when measured in water does not differ substantially from that measured in acetonitrile, particularly at a reduced viscosity of about 1). A number of catalysts can be used to effect the polymerization reaction. Among these are certain pure metal carbonates which, preferably, contain at least about 0.1 percent by weight of sorbed water and preferably are substantially free of non-sorbed water, such as calcium, strontium, and barium carbonate. These carbonates are preferably used in the bulk polymerization of ethylene oxide at a concentration of about 0.3 to 3 percent by weight, based on the weight of the ethylene oxide to be polymerized. The polymerization reaction is preferably carried out at a temperature in the range from 90° C. to 150° C. The use of such carbonates is further disclosed and claimed in the application of F. N. Hill and F. E. Bailey, Jr., entitled "Polymerization of Epoxides," Serial No. 587,933, filed May 29, 1956, now abandoned, and assigned to the same assignee as the present invention.

The derivatives obtained by reacting an alkaline earth metal with organic hydroxy compounds can also be used to polymerize ethylene oxide to produce polymers with reduced viscosities of about 1.0 and greater. Materials such as strontium methylate, calcium glycoxide, barium phenolate, the calcium derivative of 2-methoxyethanol, and the calcium derivative of diethylene glycol are satisfactory catalysts for the polymerization reaction. Care should be taken to avoid degradation of these catalysts by reactive gases such as moist air. Catalysts such as these can be used in a concentration in the range of from about 0.1 to about 2 percent by weight, based on the weight of the ethylene oxide to be polymerized, while employing a reaction temperature preferably in the range from about 90° C. to 150° C. as is further disclosed and claimed in the application of F. N. Hill, J. T. Fitzpatrick and F. E. Bailey, Jr., entitled "Process for the Polymerization of Epoxides Using Alkaline Earth Metal Derivatives of Organic Hydroxy Compounds and New Compositions Obtained Thereby," Serial No. 587,954, filed May 29, 1956, now abandoned, and assigned to the same assignee as the present invention.

The hexammoniates and amides of the alkaline earth metals and the decomposition products of the hexammoniates which contain only the alkaline earth metal, nitrogen, and hydrogen are particularly well adapted to producing poly(ethylene oxide) with a reduced viscosity greater than 30 when measured in a concentration of 0.2 gram of polymer per 100 milliliters of solution in acetonitrile at 30° C.

The hexammoniates can be made by reacting the appropriate alkaline earth metal with liquid ammonia. The product can easily be recovered by allowing the unreacted ammonia to evaporate. On standing, while protected from reactive gases and vapors, the hexammoniates decompose to give the amides as ultimate products. Methods for making the hexammoniates and amides are found in the articles of Bergstrom and Fernelium in Chem. Revs. 12, 43 (1933) and in Chem. Revs. 20, 413 (1937). These catalysts should be carefully protected from reactive gases (the hexammoniates are pyrophoric) during preparation and in all operations after preparation. These catalysts are preferably employed in concentrations in the range from about 0.02 percent to 10 percent by weight, based on the weight of the ethylene oxide charge while using a reaction temperature preferably in the range from about 0° C. to 60° C. as is further disclosed and claimed in the application of F. N. Hill, J. T. Fitzpatrick and F. E. Bailey, Jr., entitled "Polymerization of Epoxides and New Products Obtained Thereby," Serial No. 587,955, filed May 29, 1956, now abandoned, and assigned to the same assignee as the present invention.

The catalysts described for the preparation of the ethylene oxide polymers can also be used to prepare copolymers comprising two different alkylene oxides polymerized therein such as ethylene oxide, propylene oxide, the epoxybutanes, the epoxypentanes, styrene oxide, and the like, as is further disclosed and claimed in the application of F. E. Bailey, Jr., entitled "Ethylene Oxide Copolymers," Serial No. 587,935, filed May 29, 1956, now abandoned, and assigned to the same assignee as the present invention. Methods for making high polymers of propylene oxide, and copolymers of propylene oxide with other lower olefin oxides and styrene oxide are shown in United States Patents Nos. 2,706,181, 2,706,182 and 2,706,189.

In making such high molecular weight polymers and copolymers it is desirable that high purity olefin oxides be used. Water, oxygen and carbon dioxide are to be avoided as are aldehydes.

In addition, ethylene oxide polymers which have been molecularly degraded to a reduced viscosity of about 1.0 by the reaction with a halogenating agent such as an alkali metal hypochlorite or alkaline earth metal hypochlorite can be employed as the polyether component. The molecular degradation of poly(ethylene oxide) via treatment with a halogen or halogen liberating compound is the subject matter of application Serial No. 668,306, entitled "Halogen Modified Poly(alkylene oxide) Resins," by K. L. Smith et al., filed June 27, 1957, now abandoned, assigned to the same assignee as the instant application. Each and every application referred to previously is hereby incorporated by reference.

A variety of phenolic compounds are suitable for the preparation of the association products. Preferred phenolic compounds, as mentioned previously, are those with at least 0.5 mole phenolic group, on the average, per 100 molecular weight of the phenolic compound. The term "nuclear" as used herein in the definitions of phenolic compounds refers to an aromatic hydrocarbon nucleus containing at least one phenolic group. The phenolic compounds can contain elements besides carbon, hydrogen and oxygen such as silicon, sulfur, nitrogen, halogen, phosphorus and the like. These elements can be contained in organic groups such as ester, alcohol, carboxylic acid, acid anhydride, ketone, aldehyde, amide, amine, imide, urethane, ureide, nitrile, nitro, phosphoric acid ester, sulfuric acid ester, sulfonic acid, mercaptan, thioether, sulfoxide, sulfone, silane, siloxane, and the like. Various groups may be desired in the association products to modify the properties of the materials or to serve as reactive sites for further chemical transformations. Illustrative of classes of phenolic compounds which can associate with the polyethers defined herein to produce useful association products are mononuclear phenolic compounds such as phenol, cresol, dimethylphenol, chlorophenol, picric acid, resorcinol, hydroquinone, amylphenol, xylenol, alkoxyphenol, phloroglucinol, eugenol, trimethylolphenol, naphthol, and the like; dinuclear phenolic compounds such as 2,2-bis(p-hydroxyphenyl)propane, bis(p-hydroxyphenyl)methane, bis(beta-naphthol), tannic acid, gallic acid, pyrogallic acid, methylene disalicylic acid, hexachlorophene, dichlorophene, and the various diphenols and diphenylol methanes disclosed in United States Patents Nos. 2,506,486 and 2,744,882, and the like; trinuclear phenolic compounds such as 1,1,3-tris(hydroxyphenyl)propanes, 1,1,5-tris(hydroxyphenyl)pentanes, 2,6-bis(4-hydroxybenzyl)phenol and its methylol derivatives, 2,6-bis(2-hydroxybenzyl)phenol and its methylol derivatives, 2,4-bis(2-hydroxybenzyl)phenol and its methylol derivatives, and the like; tetranuclear phenolic compounds such as 1,1,2,2-tetrakis(hydroxyphenyl)ethanes, 1,1,4,4-tetrakis(hydroxyphenyl)butanes, 1,1,10,10-tetrakis(hydroxyphenyl)decanes, 1,1,3,3-tetrakis(hydroxyphenyl)-2-nitropropanes, and the like; and other higher polynuclear phenolic compounds.

The phenolic compounds employed can be a single compound of definite composition or a mixture of isomers together with a small amount of residue product as obtained in the preparation of such compounds. Complex mixtures derived from natural sources which contain multiple phenolic groups are also useful. Illustrative of the classes of natural products are water-soluble extracts such as mimosa, chestnut, quebracho and the like.

Particularly outstanding phenolic compounds for the production of association products valuable in filming, coating, casting and extruding applications are the complex phenolic novolak and resole type resinous materials. As described hereinabove, the polyether can be contacted with these condensation-type phenolic compounds in the primary condensation stage or in a subsequent partially-condensed or condensed stage of the phenolic condensation reaction.

Novolaks are believed to be mixtures of polynuclear compounds of the diphenylmethane type of structure, such as 4,4'-dihydroxydiphenylmethane and 2,4'-dihydroxydiphenylmethane formed by the Baeyer reaction of phenol and formaldehyde. In a typical synthesis, novolaks are prepared by condensing one mole of phenolic compound, such as phenol or cresol, with 0.8 mole of an aldehyde, such as formaldehyde or furfural, under acid conditions at a temperature around 160° C. to 170° C. The polynuclear products frequently contain 6 to 8 units and may contain 12 or more units. Novolaks, as such, are non-curable, thermoplastic resins. They can be converted to thermoset resins by a second-stage treatment. This involves heating the novolak with formaldehyde in an alkaline medium. If the presence of water is undesirable, such as in molding applications, then the novolak is heat-treated with hexamethylenetetramine (aldehyde-liberating compound). The preparation and properties of novolak-type phenolic materials are disclosed in United States Patents Nos. 2,610,955, 2,744,882 and 2,754,335.

Resoles, or Bakelite-type resins, are one-stage thermosetting resins produced by the condensation of phenols and aldehydes under alkaline conditions. It is believed that resoles differ from novolaks in that polynuclear methylol-substituted phenols are formed as intermediates in the case of the resoles. A resole produced by the condensation of phenol with formaldehyde most likely proceeds through an intermediate having the following illustrated type of structure:

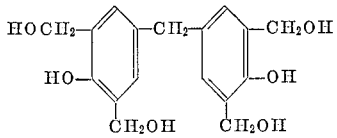

In a typical synthesis, resoles are prepared by heating one mole of phenol with 1.5 moles of formaldehyde under alkaline conditions. Then water and other volatiles are removed and condensation is completed at elevated temperatures under pressure.

The association products of polyethers with resinous phenolic compounds such as novolaks and resoles have a broad range of valuable properties. The particular combination of properties is largely dependent on the ratio of polyether and phenolic components and their respective nature. With poly(ethylene oxide) and novolak or resole resin as the association product components, for example, the properties of the final association product are controlled by consideration of several factors.

High melting or thermoset association products can be formed by using a major proportion (e.g., 70 to 95 weight percent) of phenolic component and submitting the mixture to heat and pressure in the presence of a basic catalyst. The association products so produced, as compared to conventional phenolic resins, have better mold release characteristics and provide greater molding latitude. Formed articles made therefrom possess greater flexibility, toughness and impact strength and have a lighter color. Furthermore, all of the benefits derived from these novel resins are obtained from the resin itself without the need for fillers, lubricants, and the like, as are required for conventional phenolic resins. The toughness and transparency of the association products increases as the proportion of the phenolic component increases. An exceptional advantage of the high phenolic content association products (e.g., up to about 80 weight percent phenolic) is that they are readily and easily extrudable on conventional equipment. These same association products can serve as efficient resinous plasticizers for conventional phenolics compatible in all proportions.

Thermoplastic and partially thermosetting association products can be formed by using a large proportion (e.g., 30 to 90 weight percent) of the polyether component. As compared to conventional polyether resins such as poly(ethylene oxide), the association products are much less water-sensitive and are more stable. Thermoplasticity of the association products is also favored by combining the polyether and phenolic components under acid conditions.

The polyether-phenolic association products herein described can be prepared in the presence of or can have added to them substantial, even major, proportions of materials which do not form any part of the polyether-phenolic association product per se and can be produced in the presence of materials which do not form part of the polyether-phenolic association product provided the materials do not exert an inhibiting effect on the preparation of the product. Such materials, though inert with respect to polyether-phenolic products and their preparation, nonetheless, are useful additives. Inert additives such as these include solvents for the reactants and auxiliary components as previously described; fillers such as calcium carbonate, the neutral clays, mica, carbon blacks, and wood flour; plasticizers and softening agents for the reaction components or reaction products such as water, high-boiling simple alcohols, diols and triols; and dyes, pigments, surfactants, humectants, dispersants, flatting agents, and similar materials.

In addition to the applications described hereinabove, various association products of this invention can be employed in phonograph records, gears, bearings, gaskets, washers, pipe plugs, seal rings, pulleys, shoe soles, skis, tobacco containers, humidors, flower pots, floor tile, pump impellers, pipes, solid rocket fuels, and as components in polishes and waxes, and the like.

The following examples illustrate specific embodiments of the invention. The polyether and phenolic components and methods of preparation of the association products have been varied to demonstrate various aspects of the invention.

EXAMPLE 1

This example illustrates the formation of association products when poly(ethylene oxide) polymer is contacted with cresol. It is conducted according to the association without condensation method and shows the effect of different ratios of reactants upon the qualitative amount of precipitate produced.

The poly(ethylene oxide) polymer was prepared by polymerizing ethylene oxide (7.5 pounds) in toluene solution in the presence of strontium carbonate catalyst (0.15 pound) at a temperature of 110° C. to 125° C. for a period of ten hours. The polymer so produced had a reduced viscosity of 3.2 at a concentration of 0.2 gram in 100 milliliters of acetonitrile (a molecular weight of approximately 250,000). The polymer was dissolved in water to form a 7 percent total solids solution.

To the solution was added varying ratios of a mixture of cresols which had a pH of 5.45 (Eastman Kodak Company, 54 percent meta-cresol, 29 percent para-cresol and 17 percent other phenolics). The extent of precipitation and the pH of the mixtures were determined. The precipitates formed were washed with distilled water and then mixed into freshly distilled water and rolled overnight on a set of can rolls. The precipitate did not redissolve under the conditions of the test. The results are listed in Table I.

*Table I*

| Ratio of Poly(ethylene oxide) to Cresol | pH of Mixture | Extent of Precipitation |
|---|---|---|
| 80:20 | 7.96 | Slight. |
| 70:30 | 8.00 | Do. |
| 60:40 | 7.80 | Do. |
| 50:50 | 7.86 | Considerable. |
| 40:60 | 7.70 | Do. |
| 30:70 | 7.52 | Do. |
| 20:80 | 7.40 | Do. |
| 10:90 | 6.72 | Do. |

EXAMPLE 2

This example illustrates the formation of association products when solutions of resinous poly(ethylene oxide) are mixed with a variety of simple and complex phenol compounds.

A poly(ethylene oxide) polymer was prepared by polymerizing ethylene oxide (34 pounds) in toluene in the presence of strontium carbonate catalyst (0.68 pound) at a temperature of 105° C. to 125° C. for a period of eighteen and one-half hours. The polymer solution was stabilized against oxidation by the addition of propyl gallate (0.14 pound). The polymer had a reduced viscosity of 3.14 at a concentration of 0.2 gram in 100 milliliters of acetonitrile (corresponds to a molecular weight of approximately 250,000). A 5.84 percent total solids solution of the polymer was prepared with distilled water.

100 grams of the aqueous poly(ethylene oxide) solution was mixed with 100 grams of a 5.84 percent CP-tannic acid [1] solution in water. A substantial precipitate was formed immediately upon the mixing of the two solutions. A major portion of the precipitate remained insoluble after the association product mixture was rolled on can rolls for a period of about sixty hours.

100 grams of the poly(ethylene oxide) polymer solution was mixed with 100 grams of a 5.84 percent total solids solution of CP-pyrogallic acid [2] in water. No precipitate formed until an additional 5.84 grams of pyrogallic acid in 10 milliliters of distilled water was added. The precipitate that formed remained insoluble after the mixture was rolled on can rolls for approximately sixty hours.

100 grams of the poly(ethylene oxide) polymer solution was mixed with 100 grams of a 5.84 percent total solids aqueous solution of ortho-cresol (Eastman Kodak Company, practical grade). A heavy precipitate formed immediately upon the mixing of the solution which remained substantially insoluble when the mixture was rolled on can rolls for approximately sixty hours.

100 grams of the poly(ethylene oxide) polymer solution was mixed with 100 grams of 5.84 percent aqueous solution of phenol. A heavy precipitate was formed immediately upon the mixing of the solutions. A large portion of the precipitate remained insoluble after the mixture was rolled on can rolls for approximately sixty hours.

A heavy precipitate was immediately formed when aqueous solutions of poly(ethylene oxide) polymer and hydroquinone were mixed in the same manner as above. The precepitate remained insoluble when rolled on can rolls for a period of approximately sixty hours.

After the foregoing described association products were agitated for sixty hours on can rolls, they were recovered, washed with distilled water, dispersed in freshly distilled water and agitated again on the can rolls. The association products formed with tannic acid, ortho-cresol and phenol, respectively, were substantially insoluble after the second treatment. The pyrogallic acid and the hydroquinone association products dissolved during the second treatment.

EXAMPLE 3

This example illustrates the formation of an insoluble association product produced from a naphthol derivative and poly(ethylene oxide) polymer upon baking.

100 grams of an 8 percent solution of poly(ethylene oxide) polymer (made by bulk polymerization with strontium methylate catalyst at 120° C., reduced viscosity of 9.25 at a concentration of 0.2 gram in 100 milliliters of acetonitrile), was mixed with 8 grams of bis-beta-naphthol.[3] No precipitation occurred upon mixing of the materials, but when the mixture was applied to a glass surface and baked in an oven at a temperature of 150° C. until dry, the resulting film was found to be water-insoluble.

EXAMPLE 4

This example illustrates the controlled dissolving rate of association products formed from relatively simple phenols and resinous poly(ethylene oxide) polymers prepared according to the association without condensation method of this invention.

100 grams of the poly(ethylene oxide) solution prepared in Example 2 was mixed with 5.5 grams of a meta- and ortho-cresol mixture whereupon a precipitate was immediately formed. This precipitate was placed in an eight-ounce wide-mouthed bottle and the material was contacted with continuously changing tap water flowing in and out of the top of the bottle. The precipitate slowly dissolved in the water over a period of three hours.

EXAMPLE 5

This example illustrates the use of an inhibitor to redissolve an association product of a freshly mixed solution of a resinous polyether and a phenolic compound.

Solutions containing equal parts by weight of CP-tannic acid and a poly(ethylene oxide) polymer (reduced viscosity of 3.14 at a concentration of 0.2 gram in 100 milliliters of acetonitrile) were mixed together and a precipitate was immediately formed. The precipitate could be redissolved in an equal part mixture of acetone and water. However, after a sample of the precipitate was baked it was found to be resistant to solvation by such a mixture.

EXAMPLE 6

This example illustrates the formation and heat hardening of an association product of resinous poly(ethylene oxide) polymer and a simple phenol containing a plurality of methylol substituents.

A poly(ethylene oxide) polymer (9.1 grams, approximate molecular weight of 250,000) was dissolved in a mixture consisting of 121 grams of water and 100 grams of acetone. A high methylol, water-dilutable phenolic resin (63 grams) was combined with a mixture consisting of 50 grams of distilled water and 100 grams of acetone. The two solutions were mixed together without precipitation of association product, whereupon films were cast from the solution on glass slides and allowed to air-dry. The films were then baked for twenty-five minutes at a temperature of 150° C. The films had very good adhesion and exhibited no blush, swelling or loss of adhesion or weight upon soaking overnight in water.

In an auxiliary preparation, the same high methylol, water-dilutable phenolic resin was added to an 8 percent total solids solution of poly(ethylene oxide) in water (in the absence of acetone inhibitor) to form solutions containing ratios of polyether to phenol derivative varying between approximately 90:10 to 10:90. In the absence of acetone, precipitation of association product was evident at all ratios tested and was most pronounced at or near the equimolar ratio proportions.

EXAMPLE 7

This example illustrates the extent of water solubility and water sorption of association products of resinous poly(ethylene oxide) polymer with a variety of phenolic derivatives.

100 grams of a 5.54 percent aqueous solution of resinous poly(ethylene oxide) described in Example 2 was mixed with 70 grams of acetone and 23 grams of CP-tannic acid. The homogeneous solution was cast to form a film on aluminum foil which was baked for a period of twenty minutes at a temperature of 150° C. The film was placed in a glass thimble which in turn was inserted in a Soxhlet extractor into which cold water was continuously passed for a twenty-four hour period. The recovered sample of wet association product was weighed to determine the amount of moisture sorption, and then dried to determine the degree of insolubility of the association product thus formed.

Similarly, 100 grams of an 8 percent acetonitrile solution of poly(ethylene oxide) polymer described in Example 3 was added to 25 grams of acetone, 50 grams of acetonitrile and 26.2 grams of bis-beta-naphthol. A film

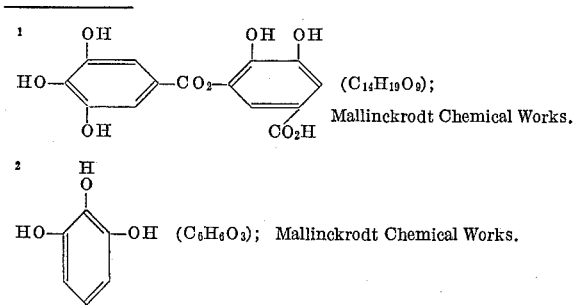

[1] $(C_{14}H_{10}O_9)$; Mallinckrodt Chemical Works.

[2] $(C_6H_6O_3)$; Mallinckrodt Chemical Works.

[3] 2,2′-dihydroxy-1,1′-dinaphthyl.

was cast from the solution, baked and extracted in the same manner as described above.

Similarly, a mixture consisting of 100 grams of an 8 percent acetonitrile solution of resinous poly(ethylene oxide) polymer described in Example 3, 25 grams of acetone and 16.16 grams of methylenebis-beta-naphthol [4] was cast to form a film on aluminum foil, then baked and extracted as described above. Pertinent data are listed in Table II.

*Table II*

| Phenol Component of Association Product | Weight Ratio of Phenolic to Polyether | Moisture Sorption, Percent | Solubility in Water, Percent |
|---|---|---|---|
| Tannic acid | 81:19 | 350 | 12.61 |
| Methylenebis-beta-naphthol | 67:33 | 171 | 4.52 |
| Bis-beta-naphthol | 77:23 | 253.5 | 48.7 |

EXAMPLE 8

This example illustrates the different properties obtained by varying the ratio of polyether and phenolic components in an association product.

Resinous poly(ethylene oxide) polymer was prepared by solution polymerization of ethylene oxide in toluene employing a calcium glycoxide catalyst. The resulting polymer had a reduced viscosity of 5.23 at a concentration of 0.2 gram in 100 milliliters of acetonitrile which corresponds approximately to a molecular weight of 450,000. The polymer was dissolved in acetonitrile to form an 8.05 percent total solids solution. This solution was mixed with 1,1,3-tris(hydroxyphenyl)propane [5] in additional acetonitrile (plus acetone to prevent precipitation where needed) and stirred until a homogeneous solution was formed. Several solutions containing varying ratios of polyether and phenolic components were prepared. The solutions were cast on glass slides, air-dried twenty-four hours and then baked for a period of thirty minutes at a temperature of 150° C. Depending on the particular ratio of the polyether and phenolic components, the association products varied from soft, pliable films having good extensibility and strength to tacky pressure-sensitive materials. The properties of the respective materials are described in Table III. Further modifications of the association products can be produced by adding materials which promote thermosetting of phenolic derivatives, such as formaldehyde and a basic catalyst or hexamethylenetetramine.

*Table III*

| Ratio of 1,1,3-Tris (hydroxyphenyl)-propanes to Poly(ethylene oxide) | Adhesion to Glass | Film Clarity | Strength and Surface Properties |
|---|---|---|---|
| 1:0 | Good | Translucent | Very hard and brittle. |
| 4:1 | do | do | Hard, fair strength. |
| 3:1 | do | do | Hard, somewhat brittle. |
| 2:1 | do | do | Slightly soft, good strength and elongation. |
| 1:1 | Fair | Clear to translucent. | Soft, tacky, good elongation and fair strength. |
| 1:4 | Poor | Opaque, hazy. | Soft, dry, fair elongation, poor strength. |

EXAMPLE 9

This example illustrates the preparation of an association product of poly(ethyleneoxide) and tannins useful as a wood glue.

A water solution of poly(ethylene oxide) polymer (reduced viscosity 5.23 at a concentration of 0.2 gram in 100 milliliters of acetonitrile, prepared by solution polymerization in toluene using calcium glycoxide catalyst), mixed with mimosa extract powder [6] (6.0 grams) in the ratio of 1:2 by weight and inhibited with acetone (50 grams), was coated onto a section of Douglas fir interior plywood panels (4" x 7" x ¾"). The coated pieces were allowed to air-dry for several hours, forming a tacky coating which adhered readily when the two pieces were pressed together. The plywood panels were clamped in an ordinary C-clamp and allowed to stand overnight. The plywood panels were separated only with considerable application of force, whereupon it was found that the joint had failed in the wood section rather than in the association product glue joint.

EXAMPLE 10

This example illustrates the properties of association products as compared with the properties of the phenolic component alone.

The poly(ethylene oxide) polymer used in this example was prepared by chlorine degradation of a higher molecular weight resin produced by suspension polymerization in the presence of a calcium amide catalyst. After the chlorine treatment, the polymer had a reduced viscosity of 5.6 at a concentration of 0.2 gram in 100 milliliters of acetonitrile. The polymer was prepared as a 5.0 percent total solids solution in water, trimethylol phenol was prepared as a 20.84 percent total solids solution in water, and poly(acrylic acid) was prepared as a 14.19 percent total solids solution in water. The poly(acrylic acid) resin was previously prepared by suspension polymerization in heptane, and had a reduced viscosity in water of 0.62 at 30° C. at a concentration of 0.20 gram per 100 milliliters of solution.

Solutions were mixed according to the ratios shown in Table IV and allowed to roll on can rolls overnight. In the case of the poly(ethylene oxide)-poly(acrylic acid)-trimethylol phenol mixtures some precipitation resulted when the respective solutions were mixed, but the solid material was redissolved by the addition of acetone.

The solutions were used to cast films on glass slides, which were allowed to air-dry overnight. The films were evaluated and then baked for a period of thirty minutes at a temperature of 150° C. A description of the air-dried and baked films is tabulated in Table IV.

*Table IV*

| Composition Prepared | Air-Dried Film | Baked Film |
|---|---|---|
| Poly(ethylene oxide) : Trimethylol phenol :: 4:1. | Hazy, soft | Soft, greasy surface. |
| Poly(ethylene oxide) : Trimethylol phenol :: 1:1. | Hazy, tacky | Hazy, stiff. |
| Poly(ethylene oxide) : Trimethylol phenol :: 1:4. | Clear, tacky | Clear, flexible. |
| Poly(ethylene oxide) : Poly(acrylic acid) : Trimethylol phenol :: 34:51:15. | Clear, soft, flexible. | Clear, slightly flexible. |
| Poly(ethylene oxide) : Poly(acrylic acid) : Trimethylol phenol :: 22:33:45. | Clear, flexible, tacky. | Clear, brittle but continuous. |
| Poly(ethylene oxide) : Poly(acrylic acid) : Trimethylol phenol :: 16:24:60. | do | Do. |
| Trimethylol phenol | Liquid | Very brittle, cracked non-continuous film. |

The baked films were soaked in water overnight. None of the films dissolved, although the simple poly(ethylene oxide)-trimethylol phenol compositions exhibited increased degrees of swelling and loss of adhesion to the glass substrates as the amount of poly(ethylene oxide) polymer in the compositions increased. In the case of the poly(ethylene oxide)-poly(acrylic acid)-trimethylol phenol association product, the adhesion of the films to glass was good after the water exposure and no swelling of the film was evident as a result of the treatments.

---

[4] 2,2'-dihydroxy-1,1'-dinaphthylmethane.
[5] A reaction product of phenol and acrolein containing ortho- and para-isomers.
[6] A catchol tannin, American Dyewood Company. Water-soluble extract assays about 68.5 percent tannin, and is used principally for tanning hides.

EXAMPLE 11

This example illustrates the preparation of molded association products and the properties of these materials.

The same poly(ethylene oxide) polymer, and trimethylol phenol of the previous example were employed. Commercial "Acrysol" A-3 [7] poly(acrylic acid) was employed. The poly(ethylene oxide) was dissolved in water to form a 5.1 percent aqueous solution, and the trimethylol phenol was utilized as a 20.84 percent aqueous solution.

The solutions of poly(ethylene oxide) polymer and trimethylol phenol were mixed in proportions to provide 46.6 parts poly(ethylene oxide) polymer to 53.4 parts trimethylol phenol by weight. This mixture was dried at 25° C. under vacuum at a pressure of 2 millimeters of mercury until a substantially moisture-free product was obtained. This material was molded for ten minutes at 150° C. and 5000 p.s.i.g. pressure to form a 5¼ inch diameter circular plaque, light brown and translucent in appearance. The physical properties of this tough, elastomeric material are described below. A sample of the molded material was subjected to water extraction by mixing on can rolls with two hundred times its weight of water at room temperature for twenty-four hours, and 86.2 percent of the material remained insoluble.

PHYSICAL PROPERTIES OF MOLDED PLAQUE

| | |
|---|---|
| Tensile breaking strength p.s.i. | 2125 |
| Elongation at break percent | 30 |
| Stiffness modulus, ASTM p.s.i. | 20,400 |
| $T_f$ ° C. | −31 |
| $T_4$ ° C. | +20 |
| $T_B$ ° C. | −16 |
| Hardness, Shore "D" scale | 53 |

By the same procedure, a three-way mixture of 28.34 parts poly(ethylene oxide), 38.45 parts of poly(acrylic acid) and 33.12 parts of trimethylol phenol by weight was prepared and dried as above. The mixture was molded for two minutes at 120° C. and 1000 p.s.i.g. pressure to produce a transparent, light yellow, very flexible material which had very limited extensibility, relatively low tear resistance and good indentation resistance. The product composition had properties suitable for use as a resilient coating or shock-resistant molding material.

In the manner described in this example and the previous example, other polycarboxylic acids besides poly(acrylic acid) can be employed which are characterized as containing an average of from about 0.3 to 1.7 free carboxylic acid groups per 100 molecular weight, and having an average molecular weight in the range between about 600 and 2,000,000, and higher.

EXAMPLE 12

This example illustrates the prepartion of association products from resinous poly(ethylene oxide) polymers and a variety of natural products containing tannins.

The resinous poly(ethylene oxide) polymer employed in this example was prepared by chlorine degradation of high molecular weight suspension polymerized resin, and is identical to that used in the previous example. To 5.5 percent total solids solutions of the polymer in water in separate containers were added an approximately equal quantity of acetone, together with spray-dried mimosa, quebracho or chestnut extract powders. These extract powders are catechol, and pyrogallol tannins, respectively. Typical analyses reported by the American Dyewood Company follow:

| | Spray Dried Mimosa Extract Powder | Spray Dried Quebacho Extract Powder | Spray Dried Chestnut Extract Powder |
|---|---|---|---|
| Tannin | 68.47 | 78.34 | 70.10 |
| Non-tannins | 27.53 | 15.22 | 20.73 |
| Insolubles | 0.83 | 0.92 | 1.44 |
| Water | 3.17 | 5.52 | 7.73 |
| Total solids | 96.83 | 94.48 | 92.27 |
| Soluble solids | 96.00 | 93.56 | 90.83 |

The addition of acetone prevented precipitation which otherwise would occur as a result of association between the tannins and the poly(ethylene oxide) polymer. After the mixtures had rolled on a set of can rolls overnight, they were cast as films on glass slides and air-dried at room temperature for five hours. After the films were evaluated, they were then baked for two hours at 150° C. and again evaluated. The film properties are tabulated in Table V.

*Table V*

| Tannin Extract | Ratio of Poly-(ethylene oxide) to Tannin Extract | Physical Properties of Air-Dried Film | Physical Properties of Baked Film |
|---|---|---|---|
| Mimosa | 4:1 | Dry, flexible, water-soluble. | Dry, flexible, water-soluble. |
| | 1:1 | Tacky, flexible, slightly water-soluble. | Slightly tacky, adherent, slightly water-soluble. |
| | 1:4 | Brittle, water-insoluble, hard. | Hard, dry, adherent, water-insoluble. |
| | 1:2 | | 73.3 percent water-insoluble. |
| Quebracho | 4:1 | Dry, flexible, water-soluble. | Dry, adherent, flexible, water-soluble. |
| | 1:1 | Tacky, adherent, flexible, partially water-soluble. | Slightly tacky, adherent, flexible, partially water-soluble. |
| | 1:4 | Dry, adherent, brittle, water-insoluble. | Dry, adherent, brittle, water-insoluble. |
| | 1:2 | | 57.2 percent water-insoluble. |
| Chestnut | 4:1 | Dry, flexible, water-soluble. | Dry, adherent, flexible, water-soluble. |
| | 1:1 | Tacky, flexible, adherent, slightly water-soluble. | Tacky, flexible, adherent, slightly water-soluble. |
| | 1:4 | Dry, brittle, water-insoluble. | Dry, brittle, water-insoluble. |
| | 1:2 | | 65.9 percent water-insoluble. |

EXAMPLE 13

This example illustrates the preparation of association products of a resinous poly(ethylene oxide) polymer and uncured novolak resins containing various average number of phenol groups per molecule.

The resinous poly(ethylene oxide) polymer employed in this example was the same as in Example 9. A 6.0 percent total solids water solution of the polymer was prepared. This solution was mixed with acetone and different novolak resins and the mixtures were allowed to roll on a set of can rolls overnight to dissolve all the residual solid material. The mixtures were then cast as films on glass slides and baked for one hour at 150° C. The mixture prepared with equal parts poly(ethylene oxide) polymer and a phenol-formaldehyde resin containing an average of two to thre phenol groups per molecule (Novolak Resin A [8]) produced a film having excellent adhesion, flexibility, clarity and gloss. It was a very soft gum-like material capable of acting as a good quick-set adhesive.

---

[7] Rohm & Haas Co. 25% aqueous solution of poly(acrylic acid).

[8] Novolak Resin A is prepared from a reaction mixture of phenol (100 parts), formalin (12 parts) and lead acetate (0.1 part) heated at about 100° C. for two hours, then after partial dehydration distillation, heated at 150° C. to 158° C. for one hour.

A second film, prepared from a mixture of equal parts by weight of the same resinous poly(ethylene oxide) polymer and a phenol-formaldehyde novolak containing an average of five to six phenol groups per molecule (Novolak Resin K[9]) afforded a film having good adhesion, flexibility, clarity and gloss similar to the first film, but it was very gummy, sticky and substantially less viscous than the first film. Both films redissolved in water after prolonged agitation (three hours at room temperature).

EXAMPLE 14

This example illustrates the preparation of poly-ether-phenol association products from a resinous poly(ethylene oxide) polymer and a resole phenolic resin.

Resinous poly(ethylene oxide), the same as that of the previous example, was prepared as a five percent total solids solution in trichloroethylene. To 200 grams of this solution was added 10 grams of phenol-formaldehyde resin (Resole Resin R[10]) which was hexamethylenetetramine-catalyzed. The resole material was added as a solution in 90 grams of ethylene glycol monoethyl ether.

A light yellow, clear, gel-free solution was obtained after six hours of mixing on can rolls. A film was cast on a glass slide (40 mil wet thickness), which was soft and slightly tacky after five days of air-drying. A baking period of thirty minutes at 150° C. converted the film into a flexible, clear, tack-free, glossy, adherent coating material. By contrast, a film prepared in a similar manner using only the resole phenolic resin produced a hard very brittle coating on the glass slide when baked.

The solubility of the two films prepared above in a mixture of 31 parts ethylene glycol monoethyl ether and 69 parts trichlorothylene was tested by mixing 0.5 gram of the films in 102 grams of solvent mixture for a period of twenty-four hours at room temperature. The poly-ether-modified film was found to have an insolubility in this solvent mixture of 88.4 percent as compared to 64.5 percent for the resole phenolic film.

EXAMPLE 15

Using the same procedure and the same resinous poly-(ethylene oxide) of the previous example, association products containing equal parts by weight of the poly(ethylene oxide) resin and a phenol-formaldehyde resin (Novolak Resin C[11]) were prepared as cast films on glass slides. The films were nearly tack-free, soft and slightly hazy after five days of air-drying. The films became clear, light amber, soft and slightly tacky after a bake period of thirty minutes at 150° C. Both the polyether resin-modified phenolic films and unmodified baked brittle phenolic films dissolved completely in the mixture of ethylene glycol monoethyl ether and trichloroethylene. Similarly, an association product prepared from equal parts by weight of the poly(ethylene oxide) resin and another phenol-formaldehyde resin (Novolak Resin D[12]) gave a pressure-sensitive adhesive coating which was completely soluble in the ethylene glycol monoethyl ether-trichloroethylene solvent mixture. A control Novolak Resin D coating prepared in the absence of poly(ethylene oxide) resin gave a very brittle, hard, glossy, poorly adherent coating when baked, and was also soluble in the solvent mixture.

EXAMPLE 16

This example illustrates the preparation of poly-ether-phenol association products which are slowly dissolvable bacteriostatic compositions.

Resinous poly(ethylene oxide) similar to that of the previous example was prepared as a 6 percent total solids solution in water. Acetone was added to the solution to form a solvent mixture of 60 percent aceton and 40 percent water. To the mixture was added hexachlorophene in an amount equal to the weight of the poly(ethylene oxide) resin in solution. Films were cast from the solution on glass slides and air-dried overnight. After a baking period of ten minutes at 150° C. the films were non-adherent, flexible and slightly hazy. They blushed immediately upon exposure to water, then gradually softened and dissolved over a period of eighteen hours. The composition was also completely soluble in a 60 to 40 acetone-water solvent mixture at room temperature.

In a similar manner, films containing equal parts of the poly(ethylene oxide) resin and dichlorophene were prepared and baked. The resulting films exhibited good flexibility, clarity, color, adhesion to the substrate, gloss and fair tensile strength. An association product prepared from 10 parts of poly(ethylene oxide) resin and 1 part dichlorophene exhibited good flexibility, strength, adhesion and color. The latter material exhibited a dry, smooth surface whereas the former material was quite tacky. As in the acse of the hexachlorophene-containing compositions above, these materials blushed immediately upon exposure to water, and gradually softened and dissolved in a 60 to 40 acetone-water mixture over a period of eighteen hours.

EXAMPLE 17

To a 6 percent total solids aqueous solution of the resinous poly(ethylene oxide) employed in the previous example, was added sufficient picric acid to form an equal parts by weight mixture of picric acid and polyether resin. Films cast from this solution were slowly dissolvable in water both in the air-dried and in the baked forms. Films having good strength and flexibility were prepared both from aqueous and acetonitrile solutions.

EXAMPLE 18

This example illustrates the preparation of a polyether-phenol association product which is a dissolvable, quick-tack, heat-stable pressure-sensitive adhesive.

180 grams of poly(ethylene oxide) resin similar to that of the previous example was dissolved in 2820 grams of distilled water by agitation of the mixture for four days on can rolls. 100 grams of this solution was mixed with 100 grams of acetone and 6 grams of methylene disalicylic acid[13] and agitated for two hours on can rolls. The resulting clear solution was cast as a 40 mil wet thickness film on a glass slide and air-dried overnight. The dried film had a sticky, frosty surface which stuck well to both paper and glass. After a bake period of thirty minutes at 150° C., the film converted into a clear, light yellow pressure-sensitive adhesive coating. The adhesive material was completely soluble in a mixture (1:1) of water and acetone.

---

[9] Novolak Resin K is prepared from a reaction mixture of phenol (100 parts), formalin (72 parts) and oxalic acid (0.56 part) heated at about 90° C. to 120° C. for three and one-half hours.

[10] Resole Resin R is prepared from a reaction mixture of phenol (100 parts), formalin (90 parts) and hexamethylenetetramine (5.63 parts) heated at about 80° C. for thirty-five to forty minutes.

[11] Novolak Resin C is prepared from a reaction mixture of natural phenol (100 parts; 90% phenol, 10% ortho-cresol), formalin (67 parts) and phosphoric acid (1 part) heated at about 90° C. to 120° C. for three hours, then treated with a mixture of sulfuric acid (1 part) and blown soya bean oil (20 parts) at room temperature, and dehydrated by distillation in the presence of barium hydroxide (3.2 parts).

[12] Novolak Resin D is prepared from a reaction mixture of phenol (100 parts), formalin (65 parts), ferric chloride (0.2 part) and water (1.2 parts) heated at about 100° C. for four hours.

[13] Heyden Chemical Corp. technical grade formaldehyde-salicylic acid condensation product. One of the isomers is illustrated by the structure:

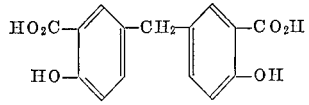

EXAMPLE 19

This example illustrates the mechanical properties of polyether-phenol association products prepared from poly(ethylene oxide) resin and tannic acid.

25 grams of tannic acid (reagent grade, Merck and Co., Inc.) was mixed with 200 grams of acetone, 200 grams of distilled water, and 25 grams of poly(ethylene oxide) resin similar to that in the previous example. The solid materials were dissolved by agitation on can rolls for a period of twenty-four hours. The solution was then dried at 50° C. for six days in a forced-air oven. The dried resinous product was then molded into a 5¼ inch diameter plaque using 500 pounds per square inch ram pressure at 150° C. for forty-five minutes. The physical properties of the molded product are tabulated in Table VI.

Table VI

| | |
|---|---|
| Ratio of poly(ethylene oxide) to tannic acid | 1:1 |
| Elongation at break ___percent | 1,000 |
| Brittle temperature ___° C. | 12 |
| Room temperature water insolubility ___percent | 88.5 |

EXAMPLE 20

This example illustrates the effects of component ratios and curing conditions on the solubility and heat stability properties of polyether-phenol association products.

Acetonitrile solutions of poly(ethylene oxide) resin identical to that employed in the previous example and a phenol-formaldehyde resin in acetonitrile (Novolak Resin F [14]) were mixed together to produce ratios of poly(ethylene oxide) resin to novolak resin of 4:1, 1:1 and 1:4, respectively. The precipitates which formed when the solutions were mixed together were allowed to stand overnight in contact with the mother liquor, after which period the mother liquor was decanted off and the solids washed with acetonitrile. The solids were dried in aluminum foil pans at 50° C. and 1 millimeter of mercury pressure until a constant weight was obtained. The yield of precipitate from the respective mixtures is tabulated in the second column of Table VII.

Similar mixtures were prepared as above with dimethylformamide as an inhibitor component to prevent precipitation of association product. Films cast from these solutions had good adhesion to glass, excellent flexibility, fair clarity, good strength and a dry smooth surface.

Additional association products were prepared from the same poly(ethylene oxide) resin and novolak resin as above by mixing these components as dry materials, in some cases with the addition of dry hexamethylenetetramine as noted in Table VII, and then molding them in a press at 5000 pounds per square inch pressure and a temperature of 190° C. for a period of five to ten minutes to produce 5¼ inch diameter plaques. Portions of these plaques were extracted with water at room temperature for twenty-four hours and the percent moisture sorption and the percent insolubility were determined. Additional portions of these plaques were heated at 300° C. for periods of fifteen minutes, four hours and twenty hours, respectively, and their percent loss in weight was observed. These data are tabulated in Table VII.

Table VII

| Ratio of Poly-(ethylene oxide) to Phenolic Novolak | Yield of Precipitate, Percent of Total Solids Present | Properties of Baked Association Products | | | | |
|---|---|---|---|---|---|---|
| | | Water Sorption, Percent | Water Insolubility, Percent | Weight Loss [1] upon Heating at 300° C. for— | | |
| | | | | 15 min. | 4 hrs. | 20 hrs. |
| 1:0 | ---- | ---- | 0 | 98 | ---- | ---- |
| 4:1 | 17.3 | ---- | ---- | ---- | ---- | ---- |
| 1:1 | 71.5 | 454 | 99.4 | ---- | ---- | ---- |
| | | 549 | 98.9 | 9.7 | 20.3 | 24.6 |
| 1:4 | 41.5 | ---- | ---- | ---- | ---- | ---- |
| ²1:1 | ---- | 47.9 | 99.6 | ---- | ---- | ---- |
| | | 48.4 | 99.7 | 3.5 | 17.7 | 23.1 |
| ³3:7 | ---- | 1.01 | 100.0 | ---- | ---- | ---- |
| | | 1.01 | 100.0 | ---- | ---- | ---- |
| ⁴0:1 | ---- | 1.00 | 100.0 | ---- | ---- | ---- |
| | | 1.00 | 100.0 | 14.2 | 16.7 | 17.1 |
| 0.1 | ---- | ---- | ---- | 8.2 | 17.1 | 17.9 |

[1] Percent.
[2] 6.5 weight percent hexamethylenetetramine added, based on total weight of composition.
[3] 8.9 weight percent hexamethylenetetramine added, based on total weight of composition.
[4] 12.3 weight percent hexamethylenetetramine added, based on total weight of composition.

EXAMPLE 21

This example illustrates the preparation of a polyether-phenol association product from polydioxolane resin and a novolak phenolic resin.

Polydioxolane [15] having a melting point between 55° C. and 60° C. and a reduced viscosity of 0.14 at 30° C. at a concentration of 0.2 gram in 100 milliliters of water, was dissolved in acetonitrile to form a 16.7 percent solution. Phenol-formaldehyde novolak resin similar to that described in the previous example was also dissolved in acetonitrile to form a 16.7 percent total solids solution. A slight precipitate formed when equal weights of the two solutions were mixed together, but it redissolved when the mixture was agitated for eighteen hours on can rolls. A film was cast from the resin solution on a glass slide, air-dried for sixteen hours and then baked for thirty minutes at 150° C. The resulting clear amber film had good adhesion to glass and had a tackiness characteristic of a pressure-sensitive adhesive. When the film was subjected to acetonitrile extraction for twenty-four hours at room temperature, it was 53.4 percent insoluble and the insoluble portion absorbed 14.2 percent solvent.

EXAMPLE 22

This example illustrates the unsatisfactory results obtained when an association product is prepared from a phenol compound and a low molecular weight polyether compound.

20 grams of polyethylene glycol (approximate molecular weight of 6000) was mixed with 20 grams of phenol-formaldehyde novolak resin (Novolak Resin E [16]) and the mixture was melted and stirred together with the addition of 2 grams of hexamethylenetetramine. After approximately five minutes of additional stirring, the solution started to thermoset as evidenced by the increase in viscosity. The mixture was then poured onto a sheet of

---

[14] Novolak Resin E is prepared from a reaction mixture of phenol (100 parts), formalin (68.25 parts), oxalic acid (1.25 parts) and water (0.7 part) heated at about 100° C. for six hours.

[15] Prepared by bulk polymerization of dioxolone (ethylene glycol formal) at room temperature for two hundred thirty-four hours employing boron trifluoride catalyst.

[16] Novolak Resin E described in Example 20.

aluminum foil and heated to continue the thermosetting reaction. The resulting orange-yellow film was flexible and tacky, but could not be bent or extended quickly without breaking.

EXAMPLE 23

This example illustrates the unsatisfactory results obtained when an association product is prepared from a phenolic compound and a low molecular weight polyether compound by the association with condensation method.

47 grams of phenol, 34 grams of 37 percent aqueous formaldehyde and 2.9 milliliters of 1.0 N sulfuric acid were mixed together and heated to reflux. After a reflux period of approximately two hours, the mixture was partially stripped of volatiles for twenty minutes under vacuum. 60 grams of polyethylene glycol (approximate molecular weight of 6000) and 6 grams of hexamethylenetetramine were added to the mixture and it was heated to a temperature of 45° C. until the polyether component was dissolved. The mixture was dried in a vacuum oven and the resulting resinous material was syrupy and transparent. A portion of the resin product was poured on aluminum foil and baked for thirty minutes at 150° C., then it was molded for twenty minutes at a temperature of 150° C. and a pressure of 1500 p.s.i.g. The circular plaque produced was transparent and flexible, but it was "cheesy" and it broke quite easily when flexed or extended. The material was too weak for physical measurement on an Instron tester.

EXAMPLE 24

In the manner of the previous example, 47 grams of phenol, 34 grams of 37 percent aqueous formaldehyde and 2.9 milliliters of 1.0 N sulfuric acid were mixed together and were refluxed with stirring for a period of ninety minutes. The mixture was cooled to 34° C. and 6 grams of hexamethylenetetramine were added to the mixture, and then 60 grams of "Pluronic" F–68 [17] slurried in 150 milliliters of acetone was added with stirring until a nearly clear solution was produced. The mixture was dried in a vacuum oven and the resulting resin product was water-white and syrupy. When this material was baked for two hours at 70° C. a clear, amber, sticky material resulted which could not be molded and cured by conventional means because of the low viscosity of the material.

In the same manner, 47 grams of phenol, 34 grams of 37 percent aqueous formaldehyde and 2.9 milliliters of 1.0 N sulfuric acid were mixed together, refluxed for two hours at 98° C. and then stripped of volatile materials for seventy minutes under vacuum. The mixture was allowed to cool to 30° C. and a slurry of 60 grams of "Pluronic" F–68, 6 grams of hexamethylenetetramine and 150 grams of acetone were added with stirring. A 30 gram sample of the mixture was neutralized with lime water. The neutralized sample and an unneutralized sample were dried in a vacuum oven. The neutralized sample was subjected to molding at 150° C. and 500 pounds pressure for twenty minutes. The resulting yellow-brown plaque could be flexed slightly but could not be bent to a ninety-degree angle without shattering. It also was quite weak and pulled apart easily. The unneutralized sample became soft and tacky after a bake period of forty minutes at 150° C.

EXAMPLE 25

This example illustrates the unsatisfactory results obtained when an association product is prepared from a phenolic compound and a poly(vinyl ether).

Using the same equipment and essentially the same procedure as the previous example, 47 grams of phenol, 34 grams of 37 percent aqueous formaldehyde and 2.9 milliliters of 1.0 N sulfuric acid were mixed together and refluxed for one hour. After volatile materials were stripped from the mixture for twenty-five minutes under vacuum, 6 grams of hexamethylenetetramine was added to the mixture after it was cooled. The mixture was transferred to a "Brabender" plastograph [18] containing the pug mill attachment and mixed with 214 grams of a 28 percent total solids solution of poly(vinyl ethyl ether) in heptane (reduced viscosity of 3.6 at a concentration of 0.1 gram per 100 milliliters of benzene at 20° C.). When mixing was complete the material was dried in a vacuum oven. The resin product recovered was tough, elastic and exhibited good adherence to the dish in which it was contained. A 7½ inch plaque was molded from a sample of this material using 1000 pounds pressure at 150° C. for twenty minutes. The plaque was bright yellow, opaque, flexible and had some extensibility. It was observed that the product was a partially incompatible mixture. When a portion of the plaque was subjected to extraction with heptane, it completely disintegrated. A portion of the plaque was subjected to physical testing on an Instron tensile tester with the following results:

| Rate of Extension, inches/minute: | Tensile Yield Strength, p.s.i. |
|---|---|
| 0.2 | 30.8, 26.7 |
| 2.0 | 52.0 |
| 5.0 | 63.3 |
| 10.0 | 74.6 |
| 20.0 | 82.7 |
| 50.0 | 98.7 |

EXAMPLE 26

This example illustrates the unsatisfactory results obtained when a polyether-phenol association product is prepared from a phenol resin and a carboxymethyl cellulose.[19]

Using essentially the same procedure as in the previous example, 46 grams of phenol, 34 grams of 37 percent aqueous formaldehyde and 2.9 milliliters of 1.0 N sulfuric acid were mixed together and refluxed for a period of two hours. The mixture was stripped of volatiles under vacuum for seventy-five minutes, and then 60 grams of carboxymethyl cellulose, 150 grams of acetone and 6 grams of hexamethylenetetramine were added. The mixture was stirred for forty minutes but it remained heterogeneous. The mixture was dried in a vacuum oven and the resulting dried material was observed to contain hard, tan, horny-type material and a brittle, easily crumbled type of material. The two kinds of materials were roughly separated and plaques were molded from each fraction. Incompatibility was quite evident in both plaques and they were very weak and easily crumbled.

EXAMPLE 27

This example illustrates that the unsatisfactory results of Examples 22 through 26 are not obtained under the same conditions when one of the preferred polyether compounds of the instant invention is employed in the preparation of a polyether-phenol association product.

Using essentially the same procedure as in the previous example, 47 grams of phenol, 34 grams of 37 percent aqueous formaldehyde and 2.9 milliliters of 1.0 N sulfuric acid were mixed together and refluxed for eighty-seven minutes. To the mixture were added 6 grams of hexamethylenetetramine and 60 grams of resinous poly(ethylene oxide) (approximate molecular weight of 250,000) and 200 grams of acetone. The mixing operation was

---

[17] Wyandotte Chemicals Corp. Reduced viscosity of 0.18 at a concentration of 0.202 gram per 100 milliliters of water at 30° C. Prepared by condensing sufficient ethylene oxide on a polypropylene glycol base (average molecular weight of 1501–1800) to form a polyoxyalkylene glycol of approximately 8000 molecular weight, and containing about 80 percent reacted ethylene oxide.

[18] Brabender Corp., Rochelle Park, New Jersey.
[19] "CMC–70 Low," Hercules Powder Company: viscosity 25–50 centipoises at a 2 percent concentration in water at 25° C. This polymer contains on the average about 0.7 carboxymethyl group per glucose unit, or about 0.35 ether group per 100 molecular weight.

completed in a "Brabender" plastograph. The material was dried in a vacuum oven and a molded plaque was prepared at a pressure of 1000 pounds per square inch and a temperature of 150° C. for twenty minutes. The plaque was clear, flexible, tack-free and quite extensible. The molded plaque was subjected to a water extraction test and was found to contain 73.8 percent insoluble material with a moisture sorption of 50.9 percent. Tensile data was obtained using the Instron tester with the results reported below.

For comparative purposes, the poly(ethylene oxide) resin component alone was found to have a stiffness value of the order of 50,000 pounds per square inch, a tensile strength at yield and break approximately equal to that found for the above-described association product, and an elongation at break and yield approximately three times that found for the association product.

| Rate of Extension, in./min. | Tensile Strength at— | | Elongation at— | | Stiffness, p.s.i. |
| --- | --- | --- | --- | --- | --- |
| | Yield, p.s.i. | Break, p.s.i. | Yield, Percent | Break, Percent | |
| 0.2 | 758 | 754 | 168 | 171 | 5,255 |
| 2 | 1,206 | 1,206 | 214 | 214 | -------- |
| 5 | 1,483 | 1,483 | 290 | 290 | -------- |
| 10 | 1,479 | 1,479 | 200 | 200 | -------- |
| 20 | 1,650 | 1,650 | 233 | 233 | -------- |
| 50 | 1,583 | 1,583 | 164 | 164 | -------- |

EXAMPLE 28

This example illustrates the preparation of a flexible polyether-phenol association product from brittle polyether and phenol components.

70 parts of poly(styrene oxide)[20] were combined with 30 parts of Novolak Resin F [21] in methyl ethyl ketone solution. The homageneous solution was allowed to evaporate and a soft, putty-like product was recovered. This material was pressed between stainless steel plates for ten minutes at a temperature of 130° C. under slight pressure. A substantially homogeneous film was obtained which was extensible, flexible and did not adhere to the stainless steel plates.

EXAMPLE 29

Using the same procedure of the previous examples, 47 grams of phenol, 34 grams of 37 percent aqueous formaldehyde and 2.88 milliliters of 1.0 N sulfuric acid were mixed together and refluxed for one and one-half hours. The reaction mixture was neutralized with lime water and 60 grams of poly(ethylene oxide) resin (approximate molecular weight of 250,000) was added. The material was transferred to a "Brabender" plastograph and it was mixed for two hours with occasional addition of acetone to facilitate the operation. After the mixture was dried in a vacuum oven a sticky rubbery residue was recovered which was molded into a plaque at 150° C. and 1000 pounds per square inch pressure for twenty minutes. The plaque was rubber, tacky and very flexible. A water extraction test conducted on this material showed 85.1 percent insolubility and 117.8 percent moisture gain.

EXAMPLE 30

This example illustrates the preparation of a polyether-phenol association product from a poly(ethylene oxide) resin and a naphthol-formaldehyde resin employing the association with condensation method.

72 grams of 2-naphthol, 34 grams of 37 percent aqueous formaldehyde, 2.9 milliliters of 1.0 N. sulfuric acid, 100 grams of ethanol and 6 grams of poly(ethylene oxide) (approximate molecular weight of 250,000) were mixed together and refluxed at 84° C. for two hours and ten minutes. The mixture was then partially stripped of volatile materials and transferred to a "Brabender" plastograph. 78.5 grams of additional poly(ethylene oxide) and 10 grams of hexamethylenetetramine were added and intimately mixed into the reaction product. After the reaction product was dried in a vacuum oven, a soft gummy gray residue was recovered which was molded at 150° C. and 300 pounds per square inch pressure for thirty minutes. The resulting molded plaque and essentially transparent, very flexible and sticky. The Teflon sheets between which the material was molded could not be readily pulled apart inasmuch as the product exhibited excellent adhesion to the Teflon.

A portion of the material dried in the vacuum oven was dissolved in a mixture of acetone, ethanol and distilled water and tested as an adhesive for polyethylene. The material had excellent adhesion to this plastic.

EXAMPLE 31

This example illustrates the preparation of a polyether-phenol association product from a resinous polyether and a cresol-formaldehyde novolak resin.

54 grams of meta-cresol, 40 grams of 37 percent aqueous formaldehyde, 3.5 milliliters of 1.0 N sulfuric acid, 100 grams of ethanol and 10 grams of poly(ethylene oxide) (approximate molecular weight of 250,000) were mixed together and heated at 87° C. for one hour and forty-five minutes. The mixture was partially stripped of volatile components and an additional 60 grams of poly(ethylene oxide) was added. The mixture was transferred to a "Brabender" plastograph to form a homogeneous rubber-like mass. After the material was dried in a vacuum oven, a soft, gummy, gray residue was recovered and 30 grams of this material was molded for thirty minutes at 150° C. and 500 pounds per square inch pressure. The resulting molded plaque was semi-transparent, bright yellow in color, soft, quite flexible and easily creased. When the product was stretched manually it was observed to have excellent elastic recovery.

EXAMPLE 32

This example illustrates the preparation of a polyether-phenol association product from resinous polyether and a meta-cresol-furfural novolak resin.

In the manner of the previous examples, 26.1 grams of furfural, 108.1 grams of meta-cresol, 25 grams of poly(ethylene oxide) and 250 milliliters of methanol were mixed together and refluxed at 69° C. for thirty-five minutes at which time 6.5 milliliters of 1.0 N sulfuric acid were added. Refluxing was continued for an additional one hour and twenty-five minutes and then the mixture was partially stripped of volatile components. The concentrated mixture was transferred to a "Brabender" plastograph and intimately mixed with 179 grams of poly(ethylene oxide) resin (approximate molecular weight of 250,000) and 20 grams of hexamethylenetetramine. After the mixture was dried in a vacuum oven, a soft dark brown residue was recovered and a portion of the material was baked for thirty minutes at a temperature of 150° C. as a precure. This material was then molded between chrome plates at 150° C. and 100 to 200 pounds per square inch pressure for fifteen minutes. The resulting plaque was substantially transparent, very soft and flexible and slightly tacky.

EXAMPLE 33

Using the procedure described in previous examples, 94 grams of phenol, 67 grams of 40 percent aqueous formaldehyde and 5.8 milliliters of 1.0 N sulfuric acid were mixed together and refluxed at 97° C. for one hour. The mixture was partially stripped of volatile components then cooled to 27° C. and mixed with 50 grams of acetone to reduce the viscosity. 121 grams of poly(propylene oxide-ethylene oxide) polymer [22] and 100

---

[20] This polymer contains 0.8 noncyclic oxygen ether group per 100 molecular weight. Prepared by polymerizing styrene oxide in bulk at 90° C. for two hours.
[21] Novolak Resin E described in Example 20.
[22] Prepared by polymerizing ethylene oxide (75 parts) and propylene oxide (25 parts) in the presence of alkaline catalyst until a bulk viscosity of approximately 21,000 centipoises at 38° C. is obtained for the liquid product.

grams of acetone were added and stirred until a complete solution was obtained, which was then blended with 12 grams of hexamethylenetetramine dissolved in an acetone-water mixture. After the solution was dried in a vacuum oven, an extremely viscous liquid residue was recovered. A sample of this material was placed in an aluminum pan and baked thirty minutes at 100° C. followed by forty-five minutes of heating at 150° C. as a precure. This material was molded between chrome plates at 150° C. and 200 to 300 pounds per square inch pressure for fifteen minutes. The resulting plaque was transparent, flexible, non-tacky and moderately extensible. On the Instron tensile testing machine, the material had a stiffness in tension of 1728 pounds per square inch. The tensile strength at 0.2 inch per minute rate of extension was 338 pounds per square inch, 450 pounds per square inch at one inch per minute extension and 606 pounds per square inch at ten inches per minute extension rate.

EXAMPLE 34

This example illustrates the preparation of a polyether-phenol association product from a phenol compound and a polyether compound which approaches the lower limit of molecular weight suitable for the practice of this invention.

In the manner of the previous examples, 94 grams of phenol, 67 grams of 40 percent aqueous formaldehyde and 5.8 milliliters of 1.0 N sulfuric acid were mixed together and refluxed for approximately one hour. The mixture was partially stripped of volatile components, and 50 grams of acetone and a solution of 121 grams of a polyether resin [23] (having a molecular weight of approximately 20,000) in 150 grams of water and 100 grams of acetone were added. 12 grams of hexamethylenetetramine dissolved in water was mixed into the material and the mixture was dried in a vacuum oven. A cream-colored gummy residue was recovered which was molded into a plaque at a temperature of 150° C. at a gradually increasing pressure up to 2000 pounds per square inch for a period of one-half hour. The cured plaque showed evidence of incompatibility. The material was transparent, slightly flexible and non-tacky, but the strength and extensibility were considerably less than in association products produced with higher molecular weight polyether components.

EXAMPLES 35 THROUGH 39

These examples illustrate the preparation of association products by the association with condensation method employing a high molecular weight poly(ethylene oxide) polymer and a resole condensation reaction mixture.

Employing the proportions listed in Table VIII, phenol, formaldehyde and barium hydroxide condensation catalyst were charged to a still and to the mixture was added poly(ethylene oxide) polymer (in the molecular weight range 3–4,000,000; approximate reduced viscosity of 45 at a concentration of 0.20 gram in 100 milliliters of water at 30° C.) in small portions. During the polymer addition, small amounts of water were added as necessary to keep the polymer in uniform dispersion.

The reaction mixtures were vacuum refluxed (355 millimeters of mercury pressure) for two and one-half hours at a temperature of 80° C. Then the product mixture was neutralized with phosphoric acid and 5.5 grams of hexamethylenetetramine was added. The pressure of the still system was reduced to about 25 millimeters of mercury and the product mixture was dehydrated to a kettle temperature of 80° C.

The resulting olive-green, rubbery mass was transferred to a 100° C. two-roll mill and rolled and sheeted. During the milling, the material turned yellow in color and eventually sheeted and end-rolled in a manner similar to a vinyl resin. The sheeted product, after it was removed from the mill and cooled, was readily grindable. When the products were compression molded between steel plates, plaques were obtained which had high strength, and good gloss and toughness.

EXAMPLES 40 AND 41

These examples illustrate the prearation of association products by the association with condensation method employing a high molecular weight poly(ethylene oxide) polymer and a novolak condensation reaction mixture.

Employing the proportions listed in Table VIII, phenol, formaldehyde, oxalic acid condensation catalyst, and poly(ethylene oxide) polymer (molecular weight in the range 3–4,000,000; approximate reduced viscosity of 45 at a concentration of 0.20 gram in 100 milliliters of water at 30° C.) were mixed together as in the previous group of examples. The mixture was refluxed for four hours at atmospheric pressure, then it was dehydrated to a kettel temperature of 160° C. The resulting product mixture was sheeted on the roll mill and ground. During the grinding operation, 10 grams of hexamethylenetetramine was added and thoroughly blended with the material. Molded plaques were prepared which had high strength, and good gloss and toughness.

Table VIII

| Ex. No. | Initial Reaction Mixture (grams) | | | |
|---|---|---|---|---|
| | Phenol | 37% Aq. CH₂O | Catalyst | Poly(ethylene oxide) |
| 35 | 100 | 150 | ᵃ 3 | 10 |
| 36 | 100 | 150 | ᵃ 3 | 15 |
| 37 | 100 | 150 | ᵃ 3 | 20 |
| 38 | 100 | 150 | ᵃ 3 | 30 |
| 39 | 100 | 150 | ᵃ 3 | 50 |
| 40 | 100 | 69 | ᵇ 0.55 | 25 |
| 41 | 100 | 69 | ᵇ 0.55 | 15 |

ᵃ $Ba(OH)_2 \cdot 8H_2O$.
ᵇ Oxalic acid.

EXAMPLES 42 THROUGH 64

Each of the fifty-five compositions listed in Table IX was prepared in the following manner. The phenolic resin in powdered form was weighed out. The appropriate quantity of powdered poly(ethylene oxide)[24] was added to enough water to form a gel (about three times its weight of water). The phenolic resin was fluxed on a mill set at about 100° C. The poly(ethylene oxide) gel was added to the refluxing phenolic resin on the mill with the addition of small quantities of water from time to time to keep the material workable. The milling was continued until the mixture was homogeneous.

Each of the compositions was compression molded between steel plates and the resulting plaques had high strength, and good gloss and toughness. Those products containing up to about 20 percent poly(ethylene oxide) exhibited relatively low water sensitivity. Those of higher polyether content, i.e., above about 20 percent, molded equally well but showed a progressively greater tendency to absorb water when immersed in water for extended periods of time. The pieces molded from materials containing about 20 or more parts poly(ethylene oxide) per 80 or less parts phenolic resin were flexible at room temperature. Materials containing less than about 20 percent poly(ethylene oxide) were rigid at room temperature and the rigidity and hardness increased with increased

---

[23] Produced by the condensation of a polyethylene glycol of 6000 molecular weight with the diglycidyl ether of bisphenol-A; reduced viscosity 0.45 at a concentration of 0.20 gram in 100 milliliters of water at 30° C.

[24] Poly(ethylene oxide) having a molecular weight in the range 3–4,000,000 employed in Examples 42 to 64 (approximate reduced viscosity of 45 at a concentration of 0.20 gram in 100 milliliters of water at 30° C.). Poly(ethylene oxide) having a molecular weight in the range 7–9,000,000 employed in Examples 42A to 64A (approximate reduced viscosity of 70 at a concentration of 0.20 gram in 100 milliliters of water at 30° C.). Poly(ethylene oxide) having a molecular weight in the range 5–800,000 employed in Examples 43B, 45B, 46B and 48B–53B (approximate reduced viscosity of 3.9 at a concentration of 0.20 gram in 100 milliliters of water at 30° C.).

phenolic resin content. Poly(ethylene oxide)-phenolic ratios up to about 40:60 yielded transparent moldings with excellent gloss.

Unlike most thermoplastics and unfilled phenolic resins, poly(ethylene oxide)-phenolic association products of this invention can be molded in conventional compression molding equipment such as is ordinarily employed to mold commercial filled phenolic molding compositions.

*Table IX*

| Example No. | Composition (parts by weight) | | |
|---|---|---|---|
| | Poly(ethylene oxide) | Resole Resin F | Resole Resin G |
| 42 and 42A | 5 | 95 | |
| 43, 43A and 43B | 10 | 90 | |
| 44 and 44A | 15 | 85 | |
| 45, 45A and 45B | 20 | 80 | |
| 46, 46A and 46B | 30 | 70 | |
| 47 and 47A | 33⅓ | 66⅔ | |
| 48, 48A and 48B | 40 | 60 | |
| 49, 49A and 49B | 50 | 50 | |
| 50, 50A and 50B | 60 | 40 | |
| 51, 51A and 51B | 70 | 30 | |
| 52, 52A and 52B | 80 | 20 | |
| 53, 53A and 53B | 90 | 10 | |
| 54 and 54A | 10 | | 90 |
| 55 and 55A | 20 | | 80 |
| 56 and 56A | 30 | | 70 |
| 57 and 57A | 33⅓ | | 66⅔ |
| 58 and 58A | 40 | | 60 |
| 59 and 59A | 50 | | 50 |
| 60 and 60A | 60 | | 40 |
| 61 and 61A | 70 | | 30 |
| 62 and 62A | 80 | | 20 |
| 63 and 63A | 90 | | 10 |
| 64 and 64A | 50 | (and 50 parts Resole Resin H) | |

Resole Resin F is prepared in the following manner. A mixture consisting of 100 parts phenol, 150 parts of 37 percent formalin and 3 parts barium hydroxide is vacuum refluxed at a pressure of about 350 millimeters of mercury for two hours at a temperature of 80° C. and neutralized with phosphoric acid. 5.5 parts of hexamethylenetetramine is added to the mixture and it is then vacuum dehydrated at a pressure of about 100 millimeters of mercury to a mass temperature of 98° C.

Resole Resin G is prepared in the following manner. A mixture consisting of 100 parts cresol, 93 parts of 37 percent formalin and 4 parts hexamethylenetetramine is vacuum refluxed at a pressure of about 200 millimeters of mercury for three-fourths hour at a temperature of 80° C., then vacuum dehydrated at a pressure of about 150 millimeters of mercury to a mass temperature of 100° C.

Resole Resin H is prepared in the following manner. 100 parts phenol, 150 parts of 37 percent formalin and 0.75 part sodium hydroxide is vacuum refluxed at a pressure of about 350 millimeters of mercury for two hours at a temperature of 80° C., neutralized with phosphoric acid and vacuum dehydrated at a pressure of about 50 millimeters of mercury to a mass temperature of 95° C.

EXAMPLE 65

The granular composition of Example 36 was compression molded for sixty seconds at 2000 pounds per square inch and 180° C. in a threaded bottle cap mold. The molding unscrewed readily from the mold form and it was transparent, yellow in color, rigid and tough, and the threads and other details were perfect.

The granular composition of Example 49 was compression molded in the same bottle cap mold. The molded product was flexible, light brown, opaque and perfect in detail. The molding did not embrittle at temperatures as low as minus 60° C.

EXAMPLE 66

A mixture consisting of:

| | Parts |
|---|---|
| Product of Example 45 | 85 |
| Pine wood flour | 65 |
| Lime | 7 |
| Stearic acid | 3 | was blended together then rolled and sheeted on a 100° C. two-roll mill. The roll sheet was air-cooled and granulated. A molded bottle cap was prepared, as in the previous example, which was opaque and perfect in detail.

EXAMPLE 67

A mixture consisting of:

| | Parts |
|---|---|
| Product of Example 36 | 50 |
| Pine wood flour | 48.5 |
| Calcium stearate | 1.5 | was blended, rolled and sheeted on a mill and granulated and molded into bottle caps as in the previous example. The molded bottle caps were opaque and perfect in detail.

EXAMPLE 68

The mixtures listed below were compounded into molding materials substantially in the manner described in Example 66:

| | A | B | C |
|---|---|---|---|
| Product of Example 42 | 85 | | |
| Product of Example 43 | | 85 | |
| Resole Resin F [1] | | | 85 |
| Pine wood flour | 65 | 65 | 65 |
| Lime | 7 | 7 | 7 |
| Stearic acid | 3 | 3 | 3 |

[1] Resole Resin F described in Examples 42 through 64.

A sample of each composition was compression molded and impact strength tests were performed with the results described below:

| Molded product: | Izod impact (ft.-lbs./in. notch) |
|---|---|
| A | 0.34 |
| B | 0.34 |
| C | 0.28 |

EXAMPLE 69

The product of Example 49 was extruded through a circular orifice die employing a screw extruder with a barrel temperature of about 100° C. and a die temperature of about 130° C. The extruded material was flexible and further extensible by added cold drawing.

While conventional phenolic molding materials require incorporation of lubricants such as stearic acid to avoid mold sticking, the molding resins of this invention require no lubricants and show excellent mold release. All the unfilled poly(ethylene oxide)-phenolic resin moldings described in instant Examples 35 through 72 exhibited no mold adhesion problem whatsoever.

EXAMPLE 70

The following tabulated data illustrate that molded poly(ethylene oxide)-phenolic resin association products have tensile strengths approximately equivalent to that of polyethylene, and impact strengths superior to that of conventional phenolic molding materials.

*Table X*

| | Molded Composition of Example 47 | Polyethylene |
|---|---|---|
| Density, gm./cm.³ | 1.270 | 0.918 |
| Tensile Impact, ft.-lb./in.³ | 197 | 225 |
| Tensile Strength, p.s.i. | 1,310 | 1,800 |
| Elongation, Percent | 50 | 600 |

Table XI

| Material | Flexural Strength (p.s.i.) | Flexural Modulus (p.s.i.) | Work to Break (ft.-lbs.) | Tensile Impact (ft.-lb./in.³) |
| --- | --- | --- | --- | --- |
| Product of Example 36 [unfilled poly-(ethylene oxide)-phenolic] | 12,000 | 4.74×10⁵ | 0.8 | 26.1 |
| Product of Example 67 [filled poly-(ethylene oxide)-phenolic] | 10,000 | 8.18×10⁵ | 0.36 | 27.0 |
| Filled Phenolic* | 9,800 | 1.04×10⁶ | 0.27 | 9.5 |

*Prepared by milling together a blend of 50 parts of Resole Resin J, 48.5 parts wood flour and 1.5 parts calcium stearate, then cooling and granulating the rolled sheet. Resole Resin J is prepared from a reaction mixture of phenol (100 parts), formalin (89.16 parts) and hexamethylenetetramine (6 parts) heated at about 80° C. for thirty-five to forty minutes.

EXAMPLE 71

The data in this example illustrate the increase in tensile strength of poly(ethylene oxide)-phenolic resin association products with increase of poly(ethylene oxide) content, and the variation of strength with variation in type of phenolic resin.

Molded Composition:  Tensile impact (ft.-lbs./in.³)
- Product of Example 47—[⅓ poly(ethylene oxide): ⅔ Resole Resin F] [1] _____ 197
- Product of Example 49—[½ poly(ethylene oxide): ½ Resole Resin F] _____ 496
- Product of Example 57—[⅓ poly(ethylene oxide): ⅔ Resole Resin G] [1] _____ 340

EXAMPLE 72

50 parts of poly(ethylene oxide) and 50 parts of Resole Resin F [25] were milled together by the method described in Examples 42 through 64. A commercial yellow pigment was added on the mill until the desired yellow hue was obtained. The material was easily compression molded into a bright yellow bottle cap having excellent gloss.

A second composition was made using this same procedure except that 15 parts of poly(ethylene oxide) and 85 parts of Resole Resin F were employed. Equally good results were obtained.

What is claimed is:

1. An association product comprising of from 1 to 99 percent by weight of a polymeric ether compound which contains at least an average of about 400 non-cyclic aliphatic oxygen ether groups, and of from 99 to 1 percent by weight of a compound which contains at least one phenolic group.

2. An association product comprising of from 1 to 99 percent by weight of (1) a polymeric ether compound which contains at least an average of about 400 non-cyclic aliphatic oxygen ether groups and has an average molecular weight of at least 18,000, and of from 99 to 1 percent by weight of (2) a compound which contains at least one phenolic group and said phenolic groups constitute not less than 0.5 mole, on the average, per 100 molecular weight.

3. The association product of claim 2 wherein the polymeric ether compound is poly(ethylene oxide).

4. An association product comprising between about 99 and 1 parts by weight of a polymeric ether compound which contains at least an average of about 400 non-cyclic aliphatic oxygen ether groups and has an average molecular weight between about 18,000 and 10,000,000, and between about 1 and 99 parts by weight of a compound which contains at least one phenolic group and said phenolic groups constitute not less than 0.5 mole, on the average, per 100 molecular weight.

5. An association product comprising between about 90 and 5 parts by weight of a polymeric ether compound having an average molecular weight between about 18,000 and 10,000,000 and containing from about 0.5 to 3.33 non-cyclic aliphatic oxygen ether groups per 100 molecular weight, and between about 10 parts and 95 parts by weight of a compound which contains at least one phenolic group and said phenolic groups constitute not less than 0.5 mole, on the average, per 100 molecular weight.

6. The association product of claim 5 wherein said polymeric ether compound comprises poly(alkylene oxide) resin and said phenolic compound comprises novolak phenolic resin.

7. The association product of claim 5 wherein said polymeric ether compound comprises poly(alkylene oxide) resin and said phenolic compound comprises resole phenolic resin.

8. An association product comprising of from 1 to 99 percent by weight of poly(ethylene oxide) having an average molecular weight between about 18,000 and 10,000,000, and of from 99 to 1 percent by weight of phenol.

9. An association product comprising of from 1 to 99 percent by weight of poly(ethylene oxide) having an average molecular weight between about 18,000 and 10,000,000, and of from 99 to 1 percent by weight of cresol.

10. An association product comprising of from 1 to 99 percent by weight of poly(ethylene oxide) having an average molecular weight between about 18,000 and 10,000,000, and of from 99 to 1 percent by weight of bis-beta-naphthol.

11. An association product comprising of from 1 to 99 percent by weight of poly(ethylene oxide) having an average molecular weight between about 18,000 and 10,000,000, and of from 99 to 1 percent by weight of tannic acid.

12. An association product comprising of from 1 to 99 percent by weight of poly(ethylene oxide) having an average molecular weight between about 18,000 and 10,000,000, and of from 99 to 1 percent by weight of trimethylol phenol.

13. An association product comprising of from 1 to 99 percent by weight of poly(ethylene oxide) having an average molecular weight between about 18,000 and 10,000,000, and of from 99 to 1 percent by weight of methylene-bis-beta-naphthol.

14. An association product comprising of from 1 to 99 percent by weight of poly(ethylene oxide) having an average molecular weight between about 18,000 and 10,000,000, and of from 99 to 1 percent by weight of gallic acid.

15. An association product comprising of from 1 to 99 percent by weight of poly(ethylene oxide) having an average molecular weight between about 18,000 and 10,000,000, and of from 99 to 1 percent by weight of resorcinol.

16. An association product comprising of from 1 to 99 percent by weight of poly(ethylene oxide) having an average molecular weight between about 18,000 and 10,000,000, and of from 99 to 1 percent by weight of 1,1,3-tris(hydroxyphenyl)propane.

17. An association product comprising of from 1 to 99 percent by weight of poly(ethylene oxide) having an average molecular weight between about 18,000 and 10,000,000, and of from 99 to 1 percent by weight of water-soluble mimosa extract.

18. An association product comprising of from 1 to 99 percent by weight of poly(ethylene oxide) having an average molecular weight between about 18,000 and 10,000,000, and of from 99 to 1 percent by weight of water-soluble quebracho extract.

19. An association product comprising of from 1 to 99 percent by weight of poly(ethylene oxide) having an average molecular weight between about 18,000 and 10,000,000, and of from 99 to 1 percent by weight of water-soluble chestnut extract.

[25] Resole Resin F and Resole Resin G are described in Examples 42 through 64.

20. An association product comprising of from 1 to 99 percent by weight of poly(ethylene oxide) having an average molecular weight between about 18,000 and 10,000,000, and of from 99 to 1 percent by weight of novolak phenolic resin.

21. An association product comprising of from 1 to 99 percent by weight of poly(ethylene oxide) having an average molecular weight between about 18,000 and 10,000,000, and of from 99 to 1 percent by weight of resole phenolic resin.

22. An association product comprising of from 1 to 99 percent by weight of poly(ethylene oxide) having an average molecular weight between about 18,000 and 10,000,000, and of from 99 to 1 percent by weight of hexachlorophene.

23. An association product comprising of from 1 to 99 percent by weight of poly(ethylene oxide) having an average molecular weight between about 18,000 and 10,000,000, and of from 99 to 1 percent by weight of dichlorophene.

24. An association product comprising of from 1 to 99 percent by weight of poly(ethylene oxide) having an average molecular weight between about 18,000 and 10,000,000, and of from 99 to 1 percent by weight of picric acid.

25. An association product comprising of from 1 to 99 percent by weight of poly(ethylene oxide) having an average molecular weight between about 18,000 and 10,000,000, and of from 99 to 1 percent by weight of methylene disalicylic acid.

26. An association product comprising of from 1 to 99 percent by weight of poly(styrene oxide) having an average molecular weight between about 18,000 and 10,000,000, and of from 99 to 1 percent by weight of novolak phenolic resin.

27. An association product comprising of from 1 to 99 percent by weight of poly(propylene oxide-ethylene oxide) having an average molecular weight between about 18,000 and 10,000,000, and of from 99 to 1 percent by weight of novolak phenolic resin.

28. A process for maintaining in solution a polymeric ether compound having a molecular weight of between about 18,000 and 10,000,000 and containing an average of at least 400 non-cyclic ether groups, and a compound containing at least one phenolic group and said phenolic groups constitute not less than 0.5 mole, on the average, per 100 molecular weight, which comprises dissolving in said solution a solubilizing amount of a solubilizing agent selected from the group consisting of alkali metal hydroxides, alkali metal salts of weak acids, ammonia, water-soluble amines and ketones, alcohols, and mono-lower alkyl ethers of alkylene glycols.

29. A curable composition which comprises of from 99 to 1 percent by weight of a phenolic compound and a compound selected from the group consisting of aldehydes and aldehyde-liberating compounds capable of undergoing phenol-aldehyde condensation, of from 1 to 99 percent by weight of a polymeric ether compound which contains at least an average of about 400 non-cyclic aliphatic oxygen ether groups, and an acid catalyst.

30. A curable composition which comprises of from 99 to 1 percent by weight of a phenolic compound and a compound selected from the group consisting of aldehydes and aldehyde-liberating compounds capable of undergoing phenol-aldehyde condensation, of from 1 to 99 percent by weight of a polymeric ether compound which contains at least an average of about 400 non-cyclic aliphatic oxygen ether groups, and a base catalyst.

References Cited in the file of this patent

UNITED STATES PATENTS

| | | |
|---|---|---|
| 2,773,114 | McAuslan | Dec. 4, 1956 |
| 2,933,459 | Gurgiolo | Apr. 19, 1960 |
| 2,934,505 | Gurgiolo | Apr. 26, 1960 |
| 2,934,518 | Smith | Apr. 26, 1960 |